(12) United States Patent
Levitsky et al.

(10) Patent No.: US 11,483,112 B2
(45) Date of Patent: Oct. 25, 2022

(54) UPLINK DOPPLER METRIC ESTIMATION BASED ON AN UPLINK REFERENCE SIGNAL

(71) Applicant: QUALCOMM Incorporated, San Diego, CA (US)

(72) Inventors: Michael Levitsky, Rehovot (IL); Assaf Touboul, Netanya (IL); Ran Berliner, Kfar-Aviv (IL); Shay Landis, Hod Hasharon (IL); Lior Uziel, Hod Hasharon (IL)

(73) Assignee: QUALCOMM INCORPORATED, San Diego, CA (US)

( * ) Notice: Subject to any disclaimer, the term of this patent is extended or adjusted under 35 U.S.C. 154(b) by 253 days.

(21) Appl. No.: 16/876,449

(22) Filed: May 18, 2020

(65) Prior Publication Data
US 2021/0359806 A1 Nov. 18, 2021

(51) Int. Cl.
*H04L 5/00* (2006.01)
*H04W 72/04* (2009.01)
*H04B 17/364* (2015.01)

(52) U.S. Cl.
CPC ......... *H04L 5/0048* (2013.01); *H04B 17/364* (2015.01); *H04W 72/0446* (2013.01)

(58) Field of Classification Search
None
See application file for complete search history.

(56) References Cited

U.S. PATENT DOCUMENTS

| 9,712,303 B2 | 7/2017 | Lee et al. |
| 10,848,285 B2 * | 11/2020 | Yoo ........................ H04L 27/261 |
| 2011/0176480 A1 * | 7/2011 | Dahlman ............ H04L 25/0226 370/328 |

(Continued)

FOREIGN PATENT DOCUMENTS

| EP | 3474479 A1 | 4/2019 |
| WO | WO-2018075963 A1 | 4/2018 |

(Continued)

OTHER PUBLICATIONS

Habtegebriel E., "Doppler Shift Estimation for Intelligent Beamweight Computation", Department of Electrical Engineering, Chalmers University of Technology, Gothenburg, Sweden 2017, 53 Pages.

*Primary Examiner* — Duc T Duong
(74) *Attorney, Agent, or Firm* — Holland & Hart LLP

(57) ABSTRACT

Methods, systems, and devices for wireless communications are described. A base station may determine the subcarrier spacing and carrier frequency used by a user equipment (UE) for communicating with the base station. The base station may select a sounding reference signal (SRS) configuration for the UE that is based on the subcarrier spacing and carrier frequency used by the UE. The SRS configuration may define the temporal spacing between repetitions of the SRS. The base station may indicate the SRS configuration to the UE so that the UE transmits repetitions of the SRS according to the SRS configuration. The base station may measure the SRS repetitions from the UE to determine the Doppler frequency for the uplink channel. The base station may use the uplink Doppler frequency to select a demodulation reference signal (DMRS) configuration for the UE.

29 Claims, 17 Drawing Sheets

(56) References Cited

U.S. PATENT DOCUMENTS

| | | |
|---|---|---|
| 2011/0235682 A1 | 9/2011 | He et al. |
| 2012/0135741 A1 | 5/2012 | Zhou et al. |
| 2015/0312009 A1* | 10/2015 | Nissila .................. H04L 5/005 370/329 |
| 2017/0311188 A1 | 10/2017 | Sun et al. |
| 2018/0069652 A1* | 3/2018 | Yamamoto ........... H04L 1/0009 |
| 2018/0191483 A1* | 7/2018 | Yamazaki ................ H04L 5/14 |
| 2018/0234912 A1 | 8/2018 | Islam et al. |
| 2018/0316469 A1 | 11/2018 | Jiang et al. |
| 2019/0020455 A1* | 1/2019 | Yamamoto ........... H04L 1/0013 |
| 2019/0028305 A1 | 1/2019 | Zhang et al. |
| 2019/0052443 A1 | 2/2019 | Cheng et al. |
| 2019/0116012 A1 | 4/2019 | Nam et al. |
| 2019/0174466 A1 | 6/2019 | Zhang et al. |
| 2019/0215712 A1 | 7/2019 | Babaei et al. |
| 2019/0342062 A1 | 11/2019 | Ren et al. |
| 2020/0053580 A1 | 2/2020 | Bagheri et al. |
| 2020/0053800 A1 | 2/2020 | Deng et al. |
| 2020/0178280 A1 | 6/2020 | Guan et al. |
| 2020/0366351 A1 | 11/2020 | Karjalainen et al. |
| 2021/0075646 A1* | 3/2021 | Yum .................. H04L 25/0226 |
| 2021/0127399 A1 | 4/2021 | Kou et al. |
| 2021/0143885 A1 | 5/2021 | Gro Mann et al. |
| 2021/0212101 A1 | 7/2021 | Jiang et al. |
| 2021/0259040 A1 | 8/2021 | Babaei |
| 2021/0274578 A1 | 9/2021 | Yum et al. |
| 2021/0306191 A1 | 9/2021 | Lin et al. |
| 2021/0314197 A1 | 10/2021 | Ding et al. |
| 2021/0328734 A1 | 10/2021 | Noh et al. |
| 2021/0352613 A1* | 11/2021 | Yoon .................... H04L 5/0051 |
| 2021/0359800 A1 | 11/2021 | Levitsky et al. |
| 2021/0359828 A1 | 11/2021 | Levitsky et al. |
| 2021/0360389 A1 | 11/2021 | Levitsky et al. |
| 2021/0367727 A1* | 11/2021 | Go ........................ H04L 5/0048 |

FOREIGN PATENT DOCUMENTS

| | | |
|---|---|---|
| WO | WO-2019028392 A1 | 2/2019 |
| WO | WO2019090774 A1 | 5/2019 |
| WO | WO-2019158678 A1 | 8/2019 |

* cited by examiner

UPLINK DOPPLER METRIC ESTIMATION BASED ON AN UPLINK REFERENCE SIGNAL

CROSS-REFERENCES

This application is related to several applications all having the same filing date of this application. These include: U.S. application Ser. No. 16/876,791 (entitled "REFERENCE SIGNAL CONFIGURATION GROUPS AND DYNAMIC REFERENCE SIGNAL CONFIGURATION SELECTION"); U.S. application Ser. No. 16/876,372 (entitled "USER EQUIPMENT ASSISTED DEMODULATION REFERENCE SIGNAL CONFIGURATION SELECTION"); and U.S. application Ser. No. 16/876,575 (entitled "UPLINK DOPPLER METRIC ESTIMATION BASED ON A DOWNLINK REFERENCE SIGNAL"). All of said applications are hereby incorporated by reference as if fully set forth below.

FIELD OF TECHNOLOGY

The following relates generally to wireless communications and more specifically to uplink Doppler metric estimation based on an uplink reference signal.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A wireless communications system may support the transmission of reference signals to estimate channel characteristics and increase a reliability of data transmissions.

SUMMARY

The described techniques relate to improved methods, systems, devices, and apparatuses that support uplink Doppler metric estimation based on an uplink reference signal. A base station may determine the subcarrier spacing and carrier frequency used by a user equipment (UE) for communicating with the base station. The base station may select a sounding reference signal (SRS) configuration for the UE that is based on the subcarrier spacing and carrier frequency used by the UE. The SRS configuration may define the temporal spacing between repetitions of the SRS. The base station may indicate the SRS configuration to the UE so that the UE transmits repetitions of the SRS according to the SRS configuration. The base station may measure the SRS repetitions from the UE to determine the Doppler frequency for the uplink channel. The base station may use the uplink Doppler frequency to select a demodulation reference signal (DMRS) configuration for the UE.

A method of wireless communication at a UE is described. The method may include receiving an indication of a configuration for a sounding reference signal, the configuration defining a temporal spacing between symbols reserved for repetitions of the sounding reference signal, transmitting repetitions of the sounding reference signal in the symbols according to the configuration for the sounding reference signal, and receiving an indication of a configuration for a demodulation reference signal based on transmitting the repetitions of the sounding reference signal.

An apparatus for wireless communication at a UE is described. The apparatus may include a processor, memory coupled with the processor, and instructions stored in the memory. The instructions may be executable by the processor to cause the apparatus to receive an indication of a configuration for a sounding reference signal, the configuration defining a temporal spacing between symbols reserved for repetitions of the sounding reference signal, transmit repetitions of the sounding reference signal in the symbols according to the configuration for the sounding reference signal, and receive an indication of a configuration for a demodulation reference signal based on transmitting the repetitions of the sounding reference signal.

Another apparatus for wireless communication at a UE is described. The apparatus may include means for receiving an indication of a configuration for a sounding reference signal, the configuration defining a temporal spacing between symbols reserved for repetitions of the sounding reference signal, transmitting repetitions of the sounding reference signal in the symbols according to the configuration for the sounding reference signal, and receiving an indication of a configuration for a demodulation reference signal based on transmitting the repetitions of the sounding reference signal.

A non-transitory computer-readable medium storing code for wireless communication at a UE is described. The code may include instructions executable by a processor to receive an indication of a configuration for a sounding reference signal, the configuration defining a temporal spacing between symbols reserved for repetitions of the sounding reference signal, transmit repetitions of the sounding reference signal in the symbols according to the configuration for the sounding reference signal, and receive an indication of a configuration for a demodulation reference signal based on transmitting the repetitions of the sounding reference signal.

In some examples of the method, apparatuses, and non-transitory computer-readable medium described herein, the configuration for the sounding reference signal may be based on a carrier frequency and a subcarrier spacing used for communicating with a base station.

In some examples of the method, apparatuses, and non-transitory computer-readable medium described herein, the configuration for the demodulation reference signal may be based on an uplink Doppler metric measured from the repetitions of the sounding reference signal.

In some examples of the method, apparatuses, and non-transitory computer-readable medium described herein, transmitting the repetitions of the sounding reference signal may include operations, features, means, or instructions for transmitting a first repetition of the sounding reference signal in a first symbol of a subframe, and transmitting a second repetition of the sounding reference signal in a second symbol of the subframe, where the first and second symbols may be separated by multiple symbols.

In some examples of the method, apparatuses, and non-transitory computer-readable medium described herein, transmitting the repetitions of the sounding reference signal may include operations, features, means, or instructions for transmitting a first repetition of the sounding reference signal in a first symbol of a first subframe, and transmitting a second repetition of the sounding reference signal in a second symbol of a second subframe, where the first and second subframes may be consecutive.

In some examples of the method, apparatuses, and non-transitory computer-readable medium described herein, transmitting the repetitions of the sounding reference signal may include operations, features, means, or instructions for using a same antenna port for the repetitions of the sounding reference signal.

In some examples of the method, apparatuses, and non-transitory computer-readable medium described herein, transmitting the repetitions of the sounding reference signal may include operations, features, means, or instructions for using at same set of antenna ports for the repetitions of the sounding reference signal.

In some examples of the method, apparatuses, and non-transitory computer-readable medium described herein, transmitting the repetitions of the sounding reference signal may include operations, features, means, or instructions for using sounding reference signal ports that may be quasi-collocated for the repetitions of the sounding reference signal.

In some examples of the method, apparatuses, and non-transitory computer-readable medium described herein, transmitting the repetitions of the sounding reference signal may include operations, features, means, or instructions for using a same transmission beam and a same antenna panel for the repetitions of the sounding reference signal.

In some examples of the method, apparatuses, and non-transitory computer-readable medium described herein, transmitting the repetitions of the sounding reference signal may include operations, features, means, or instructions for transmitting the repetitions of the sounding reference signal over a same portion of a bandwidth part configured for the UE.

Some examples of the method, apparatuses, and non-transitory computer-readable medium described herein may further include operations, features, means, or instructions for receiving an indication that the repetitions of the sounding reference signal may be to be transmitted periodically, aperiodically, or semi-persistently.

A method of wireless communication at a base station is described. The method may include selecting a configuration for a sounding reference signal based on a subcarrier spacing and a carrier frequency, the configuration defining a temporal spacing between symbols reserved for repetitions of the sounding reference signal, transmitting an indication of the configuration for the sounding reference signal to a UE, determining, for an uplink channel between the base station and the UE, a Doppler metric based on measuring repetitions of the sounding reference signal transmitted by the UE, and transmitting an indication of a configuration for an uplink demodulation reference signal that is based on the Doppler metric for the uplink channel.

An apparatus for wireless communication at a base station is described. The apparatus may include a processor, memory coupled with the processor, and instructions stored in the memory. The instructions may be executable by the processor to cause the apparatus to select a configuration for a sounding reference signal based on a subcarrier spacing and a carrier frequency, the configuration defining a temporal spacing between symbols reserved for repetitions of the sounding reference signal, transmit an indication of the configuration for the sounding reference signal to a UE, determine, for an uplink channel between the base station and the UE, a Doppler metric based on measuring repetitions of the sounding reference signal transmitted by the UE, and transmit an indication of a configuration for an uplink demodulation reference signal that is based on the Doppler metric for the uplink channel.

Another apparatus for wireless communication at a base station is described. The apparatus may include means for selecting a configuration for a sounding reference signal based on a subcarrier spacing and a carrier frequency, the configuration defining a temporal spacing between symbols reserved for repetitions of the sounding reference signal, transmitting an indication of the configuration for the sounding reference signal to a UE, determining, for an uplink channel between the base station and the UE, a Doppler metric based on measuring repetitions of the sounding reference signal transmitted by the UE, and transmitting an indication of a configuration for an uplink demodulation reference signal that is based on the Doppler metric for the uplink channel.

A non-transitory computer-readable medium storing code for wireless communication at a base station is described. The code may include instructions executable by a processor to select a configuration for a sounding reference signal based on a subcarrier spacing and a carrier frequency, the configuration defining a temporal spacing between symbols reserved for repetitions of the sounding reference signal, transmit an indication of the configuration for the sounding reference signal to a UE, determine, for an uplink channel between the base station and the UE, a Doppler metric based on measuring repetitions of the sounding reference signal transmitted by the UE, and transmit an indication of a configuration for an uplink demodulation reference signal that is based on the Doppler metric for the uplink channel.

Some examples of the method, apparatuses, and non-transitory computer-readable medium described herein may further include operations, features, means, or instructions for determining a set of candidate spacing configurations for the sounding reference signal, where each spacing configuration in the set of candidate spacing configurations may be associated with at least one combination of a subcarrier spacing and a carrier frequency, and selecting the spacing configuration from the set of candidate spacing configurations.

In some examples of the method, apparatuses, and non-transitory computer-readable medium described herein, the temporal spacing may be between symbols in a same uplink subframe.

In some examples of the method, apparatuses, and non-transitory computer-readable medium described herein, the temporal spacing may be between symbols in two consecutive uplink subframes.

Some examples of the method, apparatuses, and non-transitory computer-readable medium described herein may further include operations, features, means, or instructions for receiving a first repetition of the sounding reference signal in a first symbol of a subframe, and receiving a second repetition of the sounding reference signal in a second symbol of the subframe, where the first and second symbols may be separated by multiple symbols.

Some examples of the method, apparatuses, and non-transitory computer-readable medium described herein may further include operations, features, means, or instructions for receiving a first repetition of the sounding reference signal in a first symbol of a first subframe, and receiving a second repetition of the sounding reference signal in a second symbol of a second subframe, where the first and second subframes may be consecutive.

Some examples of the method, apparatuses, and non-transitory computer-readable medium described herein may further include operations, features, means, or instructions for receiving the repetitions of the sounding reference signal over a same portion of the bandwidth part configured for the UE.

Some examples of the method, apparatuses, and non-transitory computer-readable medium described herein may further include operations, features, means, or instructions for receiving the repetitions of the sounding reference signal over different portions of the bandwidth part configured for the UE.

Some examples of the method, apparatuses, and non-transitory computer-readable medium described herein may further include operations, features, means, or instructions for transmitting to the UE an indication that the sounding reference signal may be to be transmitted periodically, aperiodically, or semi-persistently.

Some examples of the method, apparatuses, and non-transitory computer-readable medium described herein may further include operations, features, means, or instructions for determining a second subcarrier spacing and a second carrier frequency for communicating with a second UE, and selecting a second configuration for the sounding reference signal based on the second subcarrier spacing and the second carrier frequency, the second configuration defining a temporal spacing between symbols reserved for repetitions of the sounding reference signal by the second UE.

Some examples of the method, apparatuses, and non-transitory computer-readable medium described herein may further include operations, features, means, or instructions for selecting a second carrier frequency, second subcarrier spacing, or combination thereof, for communicating with the UE, and selecting a second configuration of the sounding reference signal based on the second carrier frequency, second subcarrier spacing, or combination thereof, the second configuration defining a second temporal spacing between symbols reserved for repetitions of the sounding reference signal.

Some examples of the method, apparatuses, and non-transitory computer-readable medium described herein may further include operations, features, means, or instructions for determining a capability of the UE, where the configuration for the sounding reference signal may be based on the capability of the UE.

DETAILED DESCRIPTION

Figure 1:
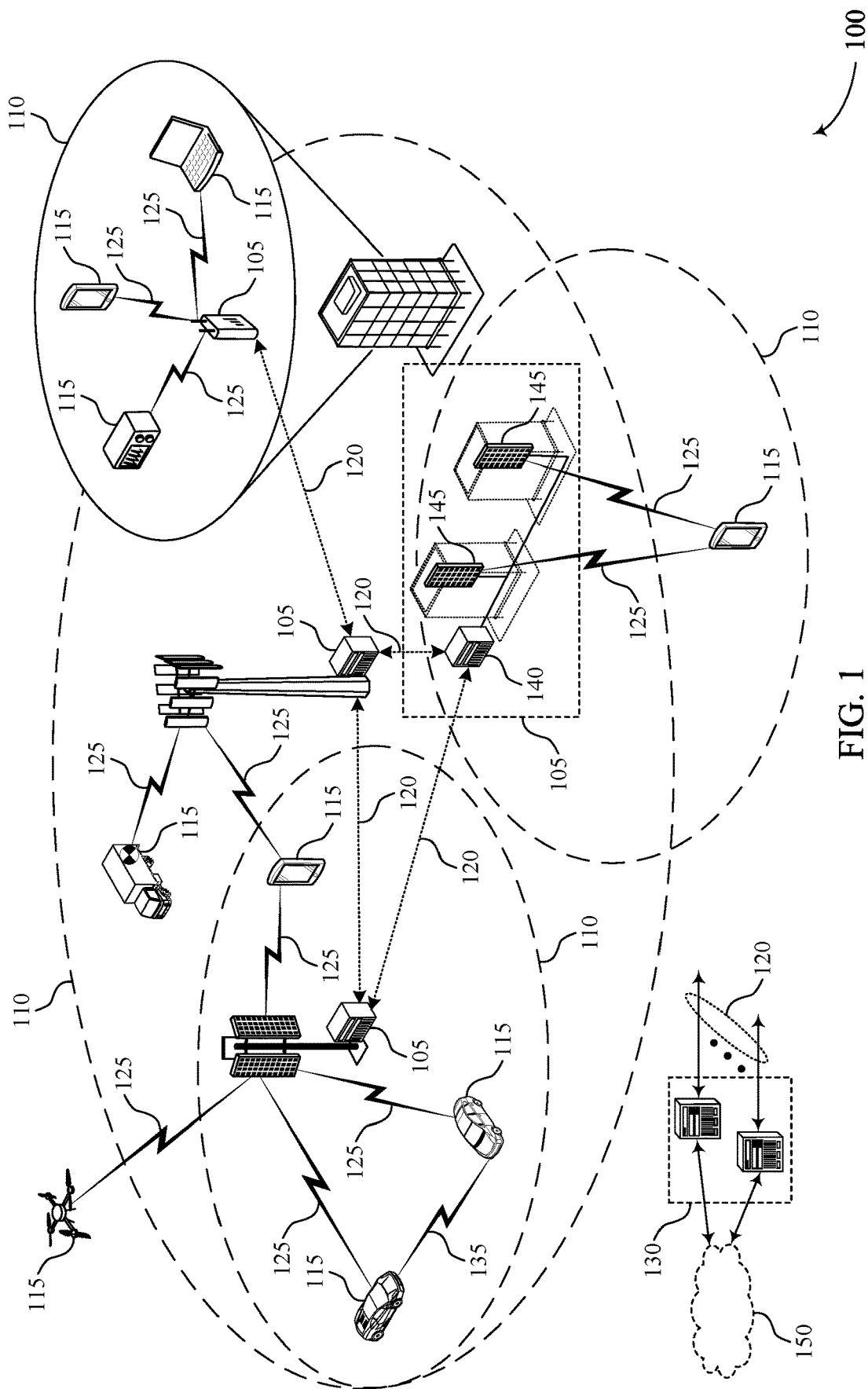
FIG. 1 illustrates an example of a wireless communications system that supports demodulation reference signal configuration selection in accordance with various aspects of the present disclosure.

Reference signals may be used to increase the reliability and efficiency of communications between wireless devices. For example, an uplink demodulation reference signal (DMRS) may be used to estimate an uplink communications channel between a base station and a user equipment (UE). Because different configurations of the uplink DMRS may be better suited for different channel conditions, a base station may dynamically select an uplink DMRS configuration for use based on one or more channel parameters that reflect the conditions of the uplink channel between the base station and the UE. For example, the base station may select an uplink DMRS configuration for an uplink channel based on the delay spread, signal-to-noise radio (SNR), and Doppler frequency associated with the uplink channel, among other metrics.

But the Doppler frequency for the uplink channel ("uplink Doppler frequency") may not be known, which may prevent the base station from selecting an uplink DMRS configuration that is properly tailored to the conditions of the uplink channel. Although the base station may estimate Doppler frequency by measuring uplink reference signals from the UE, the estimation may be inaccurate or unreliable because the reference signals transmitted by the UE are ill-suited for Doppler frequency estimation. For example, the temporal spacing between repetitions of a reference signal may too large, small, or inconsistent for an accurate Doppler frequency estimation given the subcarrier spacing and carrier frequency used by the UE.

To more accurately determine the uplink Doppler frequency, a base station may configure an uplink sounding reference signal (SRS) with a consistent repetition spacing that is based on the subcarrier spacing and carrier frequency used by the UE. The base station may indicate the uplink SRS configuration to the UE so that the UE sends repetitions of the SRS according to the repetition spacing. The base station may estimate the uplink Doppler frequency by measuring the SRS repetitions and determining the correlation in time between the SRS repetitions. The base station may then use the estimated uplink Doppler frequency as a basis, among other bases, for selecting an uplink DMRS configuration for the UE to use.

In another example, a base station may use a UE-reported Doppler frequency for a downlink channel "(downlink Doppler frequency") as a valid representative of the uplink Doppler frequency as well. For example, the base station may determine that the uplink Doppler frequency is equal to the downlink Doppler frequency when certain reciprocity conditions are satisfied. To enable the UE to estimate the downlink Doppler frequency, the base station may transmit a tracking reference signal (TRS) that has repetition spacing appropriate for Doppler frequency estimation. Thus, the UE may use measurements of the TRS as a basis for the downlink Doppler frequency reported to the base station. After determining the uplink Doppler frequency based on the downlink Doppler frequency, the base station may use the uplink Doppler frequency as a basis, among other bases, for selecting an uplink DMRS configuration for the UE to use.

Aspects of the disclosure are initially described in the context of wireless communications systems. Specific examples are then described of process flows that depict a collection of operations for demodulation reference signal configuration selection. Specific examples of reference signal configurations that support demodulation reference signal configuration selection are also described. Aspects of the disclosure are further illustrated by and described with reference to apparatus diagrams, system diagrams, and flowcharts that relate to demodulation reference signal configuration selection.

FIG. 1 illustrates an example of a wireless communications system that supports demodulation reference signal configuration selection in accordance with various aspects of the present disclosure.

The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink (DL) component carriers and one or more uplink (UL) component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

A wireless communications system 100 may support the allocation of portions of wireless spectrum (e.g., communication resources) to wireless devices. The wireless spectrum may be partitioned into resource elements (k), where a resource element may be the smallest defined unit of a communication resource—a resource element may span one subcarrier (e.g., may span 12 KHz) and one symbol (e.g., may span 66.7 μs). A communication resource may include a set of resource elements.

A wireless communications system 100 may support the transmission of multiple sets of data using a common communication resource—e.g., by using multiple spatial streams (l). By communicating multiple sets of data using a common communication resource, a throughput of a wireless communications system 100 may be increased.

A wireless communications system 100 may support the transmission of reference signals to increase an efficiency and a reliability of communications between wireless devices (e.g., a base station 105 and a UE 115). Reference signals may be transmitted from a base station 105 to a UE 115, and vice versa. Reference signals transmitted to a UE 115 may be referred to as downlink reference signal and reference signals transmitted to a base station 105 may be referred to as uplink reference signals. Reference signals may be used by the wireless devices to determine characteristics of a channel. The characteristics of a channel may also be referred to as a channel estimate or channel conditions or channel metrics. Reference signals may include CSI-RS, DL DMRS, UL DMRS, sounding reference signal (SRS), tracking reference signal (TRS), and phase tracking reference signal (PTRS).

A CSI-RS transmission may be used by a UE 115 to determine a channel estimate that is used to assist in link adaptation—e.g., by assisting in the adaptation of transmission parameters. The channel estimate may be used to determine a signal quality ratio (e.g., post-processing signal-to-noise ratio (SNR) or post-processing SINR) for the channel, a delay spread ($\tau_{rms}$) for the channel/a classification of the channel (or channel type), a precoding matrix to use for communications over the channel, a rank to use for communications over the channel, or any combination thereof. A DL DMRS transmission may also be used by a UE 115 to determine a data channel estimate that may be used to demodulate and decode transmissions received in a data channel. The channel estimate determined using the CSI-RS transmission may be different than the channel estimate determined using the DL DMRS transmission. Thus, a DL DMRS may be transmitted using resources that are associated with data resources allocated to a UE 115. A TRS transmission may be used by a UE 115 for synchronization loops and for determination of mid and long-term characteristics of a channel, such as a Doppler frequency, delay spread, and power delay profile.

An UL DMRS may be used by a base station 105 to determine a channel estimate for an uplink channel between the base station and a UE 115 that transmitted the UL DMRS (e.g., so the base station 105 can perform coherent demodulation of the physical uplink control channel (PUCCH) and the physical uplink shared channel (PUSCH)). For example, each scheduled PUCCH and PUSCH may have its own DMRS, which may assist the base station 105 with demodulation and decoding. The UL SRS may be used by a base station 105 for uplink link adaption, uplink transmission parameter selection, and uplink measurements, among other uses. In some examples, an UL SRS may be used by a base station 105 to determine the uplink channel quality over a wide bandwidth so that the base station 105 can perform frequency-selective scheduling for the UE 115 that transmitted the UL SRS.

A reference signal may be transmitted over communication resources in accordance with a reference signal configuration. A reference signal configuration may indicate which resource elements are allocated to a reference signal transmission—a resource element allocated to a transmission of a reference signal may be referred to as a pilot resource element. A group of resource elements (e.g., contiguous resource elements) within a symbol period allocated to a transmission of a reference signal may be referred to as a pilot symbol. In some cases, a reference signal configuration indicates a temporal spacing ($D_t$) between resource elements allocated to a reference signal; a frequency spacing ($D_f$) between resource elements allocated to a reference signal; and a power boosting parameter ($p_p$) that indicates a power for transmitting the reference signal resource element relative to a power for transmitting a data resource element. Different reference signal configurations may be associated with different combinations of temporal spacing, frequency spacing, and power boosting—e.g., a first reference signal configuration may be associated with a first temporal spacing, a first frequency spacing, and a first power boosting, a second reference signal configuration may be associated with the first temporal spacing, the first frequency spacing, and a second power boosting, and so on.

A base station 105 may determine configurations for the different reference signals. In some cases, a base station 105 determines a DL or UL DMRS configuration for a UE 115 by selecting the DMRS configuration from a limited set of DMRS configurations. The base station 105 may then signal the selected DMRS configuration to a UE 115 using RRC signaling.

A wireless communications system 100 may similarly increase a reliability and/or efficiency of communications between wireless devices (e.g., a base station 105 and a UE 115) by avoiding transmissions over particular resources. Resources that are left unused may be referred to as interference management resources. Interference management resources may be used by wireless devices to determine interference and noise characteristics of a channel and to assist in deriving post-processing channel quality estimations using reference signals.

CSI-IM resources may be configured to enable a UE 115 to measure interference caused by neighboring cells to data resources of a serving cell. CSI-IM resources may be used by a UE 115 to determine a noise covariance matrix estimate for a channel ($R_{nn}$). A UE 115 may use the noise estimate to obtain a refined channel estimate that takes in account noise observed on the channel. CSI-IM resources may also be used to determine a noise variance factor ($\tilde{\sigma}_{IM}^2$). CSI-IM resources may be coupled with CSI-RS transmissions—e.g., CSI-IM resource elements may be allocated with reference to (e.g., to supplement) allocated CSI-RS resource elements. Thus, CSI-RS and CSI-IM resource may be used together to determine a channel estimate and the corresponding post-processing signal quality ratio.

A UE 115 may use demodulation reference signals to determine a signal quality ratio for a data channel. In some cases, a UE 115 may use a minimum mean squared error (MMSE) equalization or linear MMSE (LMMSE) filtering approach to obtain post-processing SINR for a channel. An MMSE approach may include estimating post-processing SINR for each resource element k of each involved spatial stream l. For example, for each spatial stream l and resource element k included in a communication resource, post-processing SINR ($\gamma_l(k)_{DMRS}$) obtained using DMRS based channel estimation may be formulated based on Equation 1:

$$\gamma_l(k)_{DMRS} = \frac{1}{(\sigma_n^2 + \sigma_{ICI}^2 + \sigma_e^2) \cdot \left[ \left( \hat{H}_{eff}^H(k) \hat{H}_{eff}(k) + (\sigma_n^2 + \sigma_{ICI}^2 + \sigma_e^2) \cdot I \right)^{-1} \right]_{l,l}} - 1$$

$$\hat{H}_{eff}(k) = \hat{H}(k) \cdot P$$

$$\sigma_e^2 = f(\tau_{rms}, f_{D\_max} D_t, D_f, SNR(\rho_p))$$

where $\sigma_n^2$ may be thermal noise variance; $\sigma_{ICI}^2$ may be inter-carrier interference variance; $\sigma e^2$ may be channel estimation error variance, and $\hat{H}_{eff}(k)$ may be an effective estimated channel matrix. The channel estimation error variance may be determined to accommodate for noise that is received with and inseparable from a reference signal, modelling errors, and algorithmic limitations. Also, P may be a precoding matrix and $\hat{H}(k)$ may be an estimated channel matrix. Moreover, $\tau_{rms}$ may be a delay spread for the channel and $f_{D\_max}$ may be a Doppler frequency for the channel. Additionally, $D_t$ may be a temporal spacing between resource elements used for the demodulation reference signal; $D_f$ may be a frequency spacing between resource element used for the demodulation reference signal; and $\rho_p$ may be a power level used to transmit the reference signal resource elements relative to a power level used to transmit data resource elements. The term SNR ($\rho_p$) may be an input SNR on the pilot resource elements used for a demodulation reference signal and may be a function of $\rho_p$.

The UE 115 may determine an average post-processing SINR for each spatial stream l by averaging, for a spatial stream l, the post-processing SINRs determined across the resource elements k. The average post-processing SINR for a DMRS may be referred to as $\bar{\gamma}_{l_{DMRS}}$. In some examples, the UE 115 may use Equation 1 to determine a post-processing SINR for a channel using a DMRS, in which case $\gamma_l(k)_{RS}$ may be represented as $\gamma_l(k)_{DMRS}$. In some cases, a post-processing SINR for a channel may be dependent on a configuration of a DMRS—e.g., a post-processing SINR for a channel may be increased/decreased depending on the portion of the channel estimation error which depends on the combination of the channel characteristics and pilot configuration used for channel estimation. A base station 105 may similarly use Equation 1 to determine a per resource element post-processing SINR and average post-processing SINR using an uplink reference signal.

Additionally, or alternatively, a UE 115 may determine a post-processing signal quality ratio for a channel based on the channel characteristics determined using the CSI-RS and CSI-IM resources with noise estimation that is free of channel estimation error component $\sigma_e^2$—e.g., because the noise measured using the interference management resources may be isolated from the reference signal. That is, the noise component ($\sigma_n^2 + \sigma_{ICI}^2 + \sigma_e^2$) can be replaced with the noise variance $\bar{\sigma}_{IM}^2$ measured using an interference management resource, where $\bar{\sigma}_{IM}^2 \triangleq \sigma_n^2 + \sigma_{ICI}^2$. For example, for a spatial stream l and a resource element k, a post-processing SINR ($\gamma_l'(k)_{CSI-RS}$) be determined using a reference signal based on Equation 2:

$$\gamma_l'(k)_{CSI-RS} = \frac{1}{\bar{\sigma}_{IM}^2 \cdot \left[ \left( \hat{H}_{eff}^H(k) \hat{H}_{eff}(k) + (\bar{\sigma}_{IM}^2) I \right)^{-1} \right]_{l,l}} - 1$$

The UE 115 may determine an average post-processing SINR for each spatial stream l by averaging the post-processing SINRs determined for each resource element k. The average post-processing SINR may be referred to as $\bar{\gamma}_l'(k)_{CSI-RS}$.

The post-processing SINR calculated based on Equation 2 and the actual post-processing SINR that is expected in case of PDSCH (defined analytically for the sake of the explanation based on Equation 1) may be different from one another. In some cases, the post-processing SINR representative for PDSCH (which may be represented by the variable $\gamma_{DMRS}$) and that is expected to be obtained using DMRS based channel estimation and the post-processing SINR calculated based on Equation 2 (which may be represented by the variable $\gamma_{CSI-RS}$) may be determined based on a CSI-RS and CSI-IM resources. The $\gamma_{DMRS}$ may be an actual representative of channel conditions for data resources allocated to a UE 115 while the $\gamma_{CSI-RS}$ may be an estimate (or projection) of channel conditions for the data resources based on CSI-RS and CSI-IM resources. The expected difference between $\gamma_{CSI-RS}$ and $\gamma_{DMRS}$ can be defined/learned per channel characteristics set and per given reception conditions and may later be used to estimate an $\gamma_{DMRS}$ based on applying an adjustment to a calculated $\gamma_{CSI-RS}$. In some cases, the difference between the $\gamma_{DMRS}$ and the $\gamma_{CSI-RS}$ may be non-linear, and $\gamma_{DMRS}$ may be determined using a non-linear function—e.g., $\gamma_{DMRS}$=f ($\gamma_{CSI-RS}$). A UE 115 may determine a set of mapping functions/average differences between calculated post-processing SINR values for CSI-RS ($\gamma_{CSI-RS}$) and measured or calculated post-processing SINR values for DMRSs ($\gamma_{DMRS}$) for different combinations of CSI-RS and DMRS configurations. Thus, a difference provided by a corresponding mapping function between a $\gamma_{DMRS}$ and a $\gamma_{CSI-RS}$ may be based on a configuration of a DMRS and a configuration of a CSI-RS and defined per channel characteristics set and per given input/thermal SNR.

A wireless communications system 100 may also support the reporting of information about a channel determined using reference signals. A UE 115 may use CSI-RS to determine optimal/preferred transmission parameters for a channel, such as a preferred precoding matrix, rank, and modulation coding scheme (MCS). The UE 115 may determine a preferred transmission parameter based on determining that a transmission parameter will maximize a channel metric (e.g., a spectral efficiency metric) and/or based on a post-processing signal quality ratio (e.g., post-processing SINR) for a channel. The UE 115 may indicate the preferred reception parameters to a base station 105 in a channel state feedback (CSF) report (which may also be referred to as a channel state information (CSI) report) that may have different formats and may include a precoding matrix indicator (PMI) field that conveys a PMI, a rank indicator (RI) field that conveys an RI, a strongest layer indicator (SLI) field that conveys an SLI; and a channel quality indicator (CQI) field that conveys a CQI. The base station 105 may use the PMI and RI to determine a precoding matrix and rank to use for subsequent transmissions and the CQI to determine an MCS for subsequent transmission.

To determine a value for a CQI, the UE 115 may use a post-processing SINR value or estimated spectral efficiency evaluated using a CSI-RS ($\gamma_{CSI-RS}$). In some cases, to determine a CQI that is better representative of channel conditions and is more convenient for a data channel, the UE 115 may estimate a post-processing SINR value for a DMRS configuration that is currently configured ($\gamma_{DMRS}$). The post-processing SINR value for YDMRS may be derived from the $\gamma_{CSI-RS}$ and the corresponding mapping trained numerically for CSI-RS and DMRS configuration combination and per channel characteristic set. The UE 115 may use the estimated post-processing SINR value ($\gamma_{DMRS}$) to determine a value for the CQI. In some cases, to determine the estimated $\gamma_{DMRS}$, the UE 115 may determine a configuration used for a received CSI-RS and a configuration that is currently configured for a DMRS. The UE 115 may then identify an average difference between post-processing SINRs calculated using CSI-RSs of the CSI-RS configuration and DMRSs of the DMRS configuration. The UE 115 may use the identified average difference/mapping to obtain an estimated $\gamma_{DMRS}$ for the current DMRS configuration—e.g., by adding the average difference/or applying a mapping function to the calculated $\gamma_{CSI-RS}$. A base station 105 may use the reported CSI to adapt transmission parameters to better suit a channel—e.g., by using an indicated precoding matrix and rank and using an MCS that corresponds to the CQI value.

As described above, reference signals may be used to determine measurements for and an estimate of a channel to maintain a reliable and efficient link between wireless devices (e.g., a base station 105 and UE 115). For example, a channel state information reference signal (CSI-RS) may be used to adapt transmission parameters. Additionally, a demodulation reference signal (DMRS) may be used to determine an estimate of a data channel (e.g., a physical downlink shared channel (PDSCH)) and to assist in the demodulation and decoding of signals received over the data channel.

A DMRS configuration used by a UE 115 may be determined based on Radio Resource Control (RRC) signaling. But communication parameters that are established using RRC procedures may be unable to adapt to changes in channel and reception conditions—e.g., because RRC reconfiguration procedures are non-synchronous and associated with high latency. Thus, signaling a DMRS configuration to a UE 115 in accordance with RRC procedures may decrease a spectral efficiency of a communications link. Spectral efficiency may be a measure of throughput that can be conveyed by the link using the allocated resources—e.g., based on determining a ratio of communication resources that are allocated to data signaling rather than to control/management signaling while spectral efficiency on data resource elements may depend on selected transmission parameters, a channel, a signal to noise ratio, and a pilot configuration used for channel estimation. In some examples, changes in channel conditions that occur after the DMRS configuration is signaled cause a selected DMRS configuration to use excessive resources without providing any increase in a spectral efficiency or link efficiency of communications to a UE 115. In other examples, a change in channel conditions may cause a selected DMRS configuration to use insufficient resources for optimizing link efficiency in communications to a UE 115.

To increase a spectral efficiency of a communications link, preferred DMRS configurations may be identified by a UE 115 and signaled to a base station 105 to adapt to short-term changes in channel and reception conditions. In some examples, a wireless device may use a CSI-RS to determine a set of characteristics and a link quality characteristic (e.g., post-processing signal-to-interference-plus-noise ratio (SINR)) for a channel. The UE 115 may use the determined set of channel characteristics and the estimated link quality characteristic to estimate multiple equivalent link quality characteristics that correspond to multiple tested DMRS configurations. The UE 115 may then use the estimated equivalent link quality characteristics to identify a DMRS configuration of the multiple DMRS configurations for subsequent communications—e.g., based on determining that a spectral efficiency provided by the DMRS configuration is higher than a spectral efficiency provided by the other DMRS configurations. The UE 115 may indicate the identified DMRS configuration to a scheduling node. The base station 105 may select a DMRS configuration for subsequent transmissions to the wireless device based on the indicated DMRS configuration—e.g., the base station 105 may select the indicated DMRS configuration or a related DMRS configuration based on network scheduling criteria. By adaptively selecting DMRS configurations based on DMRS configurations indicated by a UE 115, a spectral efficiency of a link will be increased.

In some examples, the wireless device may be a base station 105 that dynamically selects an uplink DMRS configuration that increases spectral efficiency of the link since is the most suited to the current channel conditions. For example, the base station 105 may use the parameters of one or more uplink reference signals (e.g., DMRS, SRS) and a set of channel characteristics (e.g., Doppler frequency $f_{D\_max}$, delay spread $\tau_{rms}$, SNR) to estimate multiple link quality characteristics (e.g., multiple SINRs) that correspond to multiple uplink DMRS configurations. The wireless device may then use the estimated signal quality characteristics to identify an uplink DMRS configuration of the multiple uplink DMRS configurations for subsequent communications—e.g., based on determining that a spectral efficiency of the link provided by the uplink DMRS configuration is higher than a spectral efficiency provided by the other uplink DMRS configurations.

However, a base station 105 may not be able to reliably determine the Doppler frequency for the uplink channel, which may prevent the base station 105 from properly selecting a convenient DMRS configuration (e.g., because the SINR values ($\gamma_{DMRS}$) used to select the DMRS configuration are a function of the channel estimation error variance $\sigma_e^2$, which in turn is a function of the Doppler frequency $f_{D\_max}$, as shown in Equation 1). In one example, the base station 105 may estimate the uplink Doppler frequency by measuring repetitions of existing uplink reference signals (e.g., DMRS, SRS) from a UE 115. But the repetitions of these reference signals may be improperly spaced for Doppler frequency estimation, which may result in an inaccurate Doppler frequency estimation that negatively impacts the selection of an UL DMRS configuration.

To more accurately estimate the uplink Doppler frequency, a base station 105 may configure an SRS with a repetition spacing that is appropriate for reliable Doppler frequency estimation given the deployment scenario.

Because appropriate repetition spacing is important for reliable Doppler estimation, a base station 105 may select the repetition spacing for a UE 115 based on the subcarrier spacing and carrier frequency configured for the UE 115. Thus, the base station 105 may enable proper selection of an appropriate DMRS configuration that allows an increase in (or maximization of) the spectral efficiency of the link.

Alternatively, the base station 105 may estimate the uplink Doppler frequency by equating it with the downlink Doppler frequency reported by a UE 115. For example, the base station 105 may determine that there are sufficient conditions to assume channel Doppler reciprocity (which may therefore justify an assumption that the uplink Doppler frequency is equal to the downlink Doppler frequency). The downlink Doppler frequency may be determined by the UE 115 based on measurements of a downlink reference signal (e.g., a TRS) transmitted by the base station 105. Thus, the base station 105 may enable selection of an appropriate DMRS configuration that allows an increase in the spectral efficiency of a link by using the reported downlink Doppler frequency as an estimate for the uplink Doppler frequency for calculations related to UL DMRS configuration selection.

Figure 2:
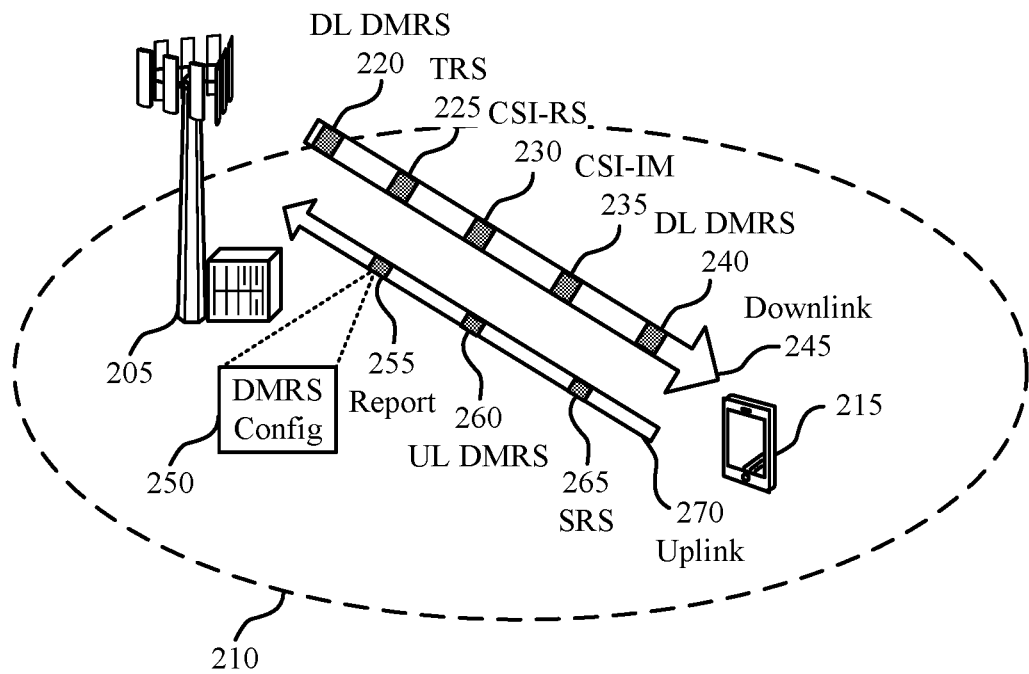
FIG. 2 illustrates aspects of a wireless communications subsystem that supports demodulation reference signal configuration selection in accordance with various aspects of the present disclosure.

FIG. 2 illustrates aspects of a wireless communications subsystem that supports demodulation reference signal configuration selection in accordance with various aspects of the present disclosure. Wireless communications subsystem 200 may include base station 205 and UE 215 which may be examples of a base station or UE described with reference to FIG. 1. Base station 205 and UE 215 may communicate with one another over downlink 245 and uplink 270 within coverage area 210, as described with reference to FIG. 1.

A DMRS configuration used by a UE may be determined based on RRC signaling. In some examples, the UE may be RRC configured with a fixed pilot pattern for a DMRS that is based on a DMRS type and a number of DMRS positions. A DMRS spacing in in time may be based on predetermined DMRS locations for a combination of a PDSCH mapping type and a PDSCH symbol duration (which may be signaled in a DCI message). A power boosting for a DMRS may be determined based on a DMRS type. An accuracy of a channel estimate depends on a level of correlation of a channel in time and frequency, input SNR on DMRS resource elements and DMRS configuration/pattern. Channel parameters and SNR conditions may be different for different UEs and may also vary in time. Thus, different DMRS configurations may be used to maximize a spectral efficiency of a link for different channel and SNR conditions. But communication parameters that are established using RRC procedures may be unable to adapt to changes in channel and reception conditions. That is, establishing a DMRS configuration using RRC procedures, may cause an excessive amount of pilots to be used or an insufficient amount of pilots to be used. To increase a spectral efficiency of a communications link, preferred DMRS configurations may be identified by a UE and reported to the network. The network may use the reported DMRS configuration to select a DMRS configuration for the UE.

An offline numerical training procedure may be performed to generate, for UE 215, one or more mappings that indicate previously determined differences (e.g., average differences) in values measured for a link quality characteristic (e.g., spectral efficiency or post-processing SINR) determined using CSI-RS transmissions and in values measured for the link quality characteristic determined using DL DMRS transmissions having different configurations. The one or more mappings may include mappings corresponding to respective channel conditions, which may include delay spread ($\tau_{rms}$), Doppler frequency ($f_{D\_max}$), and noise variance ($\tilde{\sigma}_{IM}^2$). That is, a first mapping may be associated with a first set of quantized values for $\tau_{rms}$, $f_{D\_max}$, and $\tilde{\sigma}_{IM}^2$ (e.g., $\tau_{rms}=1$, $\tilde{\sigma}_{IM}^2=1$, and $f_{D\_max}=1$), a second mapping may be associated with a second set of quantized values for $\tau_{rms}$, $f_{D\_max}$, and $\tilde{\sigma}_{IM}^2$ (e.g., $\tau_{rms}=1$, $\tilde{\sigma}_{IM}^2=1$, and $f_{D\_max}=2$), and so on.

The one or more mappings may similarly include sets of mappings for different CSI-RS configurations. That is, a first set of mappings for a first CSI-RS configuration (CSI-RS_1) may include a first mapping that is associated with a first set of values for $\tau_{rms}$, $f_{D\_max}$, and $\tilde{\sigma}_{IM}^2$ (e.g., $\tau_{rms}=1$, $\tilde{\sigma}_{IM}^2=1$, and $f_{D\_max}=1$), a second mapping that is associated with a second set of values for $\tau_{rms}$, $f_{D\_max}$, and $\tilde{\sigma}_{IM}^2$ (e.g., $\tau_{rms}=1$, $\tilde{\sigma}_{IM}^2=1$, and $f_{D\_max}=2$), and so on. And a second set of mappings for a second CSI-RS configuration (CSI-RS_2) may include a first mapping that is associated with the first set of values for $\tau_{rms}$, $f_{D\_max}$, and $\tilde{\sigma}_{IM}^2$, a second mapping that is associated with the second set of values for $\tau_{rms}$, $f_{D\_max}$, and $\tilde{\sigma}_{IM}^2$, and so on. And so on.

Although described with reference to UE 215, a similar offline numerical training procedure may be implemented by base station 205 (e.g., using uplink reference signals such as DMRS, SRS) to generate one or more mappings that indicate previously determined differences in values measured for a link quality characteristic (e.g., spectral efficiency or post-processing SINR) determined using UL DMRS or SRS transmissions and in values measured for the link quality characteristic determined using UL DMRS transmissions having other waveform and different configurations. One or more mappings that indicate previously determined differences in values measured for the link quality characteristic determined using UL DMRS or SRS of a first configuration and in values measured for the link quality characteristic determined using UL DMRS transmissions having other configurations may also be generated by base station 205.

Base station 205 may configure an initial DL DMRS configuration for UE 215 during an RRC signaling exchange. Base station 205 may then transmit, using downlink 245, first DL DMRS 240 to UE 215 in accordance with the initial DL DMRS configuration. UE 215 may use first DL DMRS 240 to decode data and/or to determine an SINR for the channel ($\gamma_{DMRS}$)—e.g., based on Equation 1. The initial DL DMRS configuration may be associated with a first combination of a temporal spacing $D_t$ between resource elements allocated to first DL DMRS 240; a frequency spacing $D_f$ between resource elements allocated to first DL DMRS 240; and a power level corresponding to $\rho_p$ used to transmit first DL DMRS 240 resource elements relative to a power level used to transmit data resource elements. The different DL DMRS configurations may be represented using different combinations of triplet ($D_t$, $D_f$, $\rho_p$)—e.g., a first DL DMRS configuration may be represented by the triplet (0,0,0), a second DL DMRS configuration may be referenced by the triplet (0,0,1), and so on.

Base station 205 may also transmit CSI-RS 230 to UE 215 in accordance with a configured CSI-RS configuration. Base station 205 may be prohibited from transmitting any signaling over CSI-IM resource 235.

UE 215 may receive CSI-RS 230 and monitor CSI-IM resource 235. UE 215 may use CSI-RS 230 to estimate the channel response and CSI-IM resource 235 to estimate a reception noise (which may be used to calculate a noise covariance matrix ($R_{nn}$). Thus, UE 215 may use CSI-IM resource 235 to determine a level of noise and interference on the channel—e.g., caused by transmissions using neighboring cells and thermal effects. UE 215 may also use the noise component to determine a noise variance $\tilde{\sigma}_{IM}^2$ for the channel.

After determining the effective channel matrix, UE 215 may use the effective channel matrix to determine a post-processing SINR for the channel based on CSI-RS 230 and CSI-IM resource 235 ($\gamma_{CSI-RS}$)—e.g., based on Equation 2. UE 215 may also use the effective channel matrix to determine a precoding matrix and rank that increase a performance of communications over the channel. Additionally, UE 215 may use the effective channel matrix to determine a delay spread $\tau_{rms}$ for the channel.

Base station 205 may also transmit TRS 225 to UE 215. UE 215 may use TRS 225 to determine a Doppler frequency $f_{D\_max}$ (e.g., a maximum doppler frequency) for the channel. UE 215 may also use TRS 225 to determine a delay spread $\tau'_{rms}$ for the channel. In some examples, UE 215 may map values determined for delay spread, Doppler frequency, and noise variance to sets of quantized values—e.g., to reduce processing complexity.

UE 215 may use any combination of CSI-RS 230, CSI-IM resource 235, and TRS 225 to determine a DL DMRS configuration that increases a spectral efficiency of communications over the channel relative to the other DL DMRS configurations. To determine the DL DMRS configuration, UE 215 may use a post-processing SINR value determined from the CSI-RS 230 and CSI-IM resource 235; a delay spread value determined from CSI-RS 230 and/or TRS 225; a Doppler frequency value determined from TRS 225; a noise variance value determined from CSI-IM resource 235; and a mapping generated based on the training procedure. That is, after determining an SINR value for $\gamma_{CSI-RS}$, UE 215 may identify the values determined for $\tau_{rms}$, $f_{D\_max}$, and $\tilde{\sigma}_{IM}^2$ and a mapping based on the identified values for $\tau_{rms}$, $f_{D\_max}$, and $\tilde{\sigma}_{IM}^2$ and a configuration used for CSI-RS 230 (e.g., for a first CSI-RS configuration, which may be represented as CSI-RS_1). The mapping may include, for each available DL DMRS configuration, an adjustment from the SINR value calculated using a CSI-RS of a CSI-RS configuration ($\gamma_{CSI-RS}$) to an estimated equivalent post-processing SINR value for a respective DL DMRS configuration (i.e., a value for $\gamma_{DMRS\_x}$, where there are N available DL DMRS configurations and x≤N).

An example mapping is provided by Table 1.

TABLE 1

| CSI-RS_1; $\tau_{rms}$ = 1, $f_{D\_max}$ = 1; $\tilde{\sigma}_{IM}^2$ = 1 | | |
|---|---|---|
| DL DMRS Configuration ($D_t$, $D_f$, $\rho_p$) | | $\gamma_{DMRS\_x}$ |
| DMRS_1 | (0, 0, 0) | $f_1(\gamma_{CSI-RS\_1})$ |
| DMRS_2 | (0, 0, 1) | $f_2(\gamma_{CSI-RS\_1})$ |
| DMRS_3 | (0, 1, 1) | $f_3(\gamma_{CSI-RS\_1})$ |
| ... | ... | ... |
| DMRS_N | (x, y, z) | $f_n(\gamma_{CSI-RS\_1})$ |

Other mappings may be generated for different combinations of $\tau_{rms}$, $f_{D\_max}$, $\tilde{\sigma}_{IM}^2$, and CSI-RS configurations. For example, while the mapping may be associated with the combination (CSI-RS_1, $\tau_{rms}$, $\tilde{\sigma}_{IM}^2$, and $f_{D\_max}$) depicted in Table 1, another mapping may be associated with a different combination of (CSI-RS_1, $\tau'_{rms}$, $\tilde{\sigma}_{IM}^2$, and $f_{D\_max}$), and so on.

A more general mapping is provided by Table 2.

TABLE 2

| CSI-RS_w; $\tau_{rms}$ = x, $f_{D\_max}$ = y; $\tilde{\sigma}_{IM}^2$ = z | | |
|---|---|---|
| DL DMRS Configuration ($D_t$, $D_f$, $\rho_p$) | | $\gamma_{DMRS\_x}$ |
| DMRS_1 | (0, 0, 0) | $f_1(\gamma_{CSI-RS\_w})$ |
| DMRS_2 | (0, 0, 1) | $f_2(\gamma_{CSI-RS\_w})$ |
| DMRS_3 | (0, 1, 1) | $f_3(\gamma_{CSI-RS\_w})$ |
| ... | ... | ... |
| DMRS_N | (m, n, o) | $f_n(\gamma_{CSI-RS\_w})$ |

UE 215 may use the mapping to derive, from a calculated $\gamma_{CSI-RS}$, SINR values for each of the available DL DMRS configurations ($\gamma_{DMRS\_x}$). That is, $\gamma_{DMRS\_x}$ may equal $f(\gamma_{CSI-RS})$, where 1>x≥N.

After determining SINR values for each of the available DL DMRS configurations, UE 215 may determine a DL DMRS configuration of the DL DMRS configurations that maximized a communication efficiency metric for the channel. For example, UE 215 may determine the DL DMRS configuration that maximizes spectral efficiency for the channel based on Equation 3:

$$\operatorname*{argmax}_{i=1:N}\left(N_{RE\_data}(\text{DMRS\_i}) \cdot \sum_{l=1:R} C_{QAM}(\bar{\gamma}_l(\text{DMRS\_i}))\right)$$

where $C_{QAM}$ may be the constrained capacity function for a maximal allowed modulation scheme (e.g., for a quadrature amplitude modulation (QAM) order) that gives the estimated spectral efficiency per resource element; $N_{RE\_data}$ may be the number of data resource elements per resource allocation (or per resource block); DMRS_i may be the DL DMRS configuration defined by a combination of ($D_t$, $D_f$, SNR($\rho_p$)); and $\bar{\gamma}_l(\gamma_{DMRS\_i})$ may be the average post-processing SINR per layer l for a corresponding DL DMRS configuration DMRS_i. $N_{RE\_data}$ may be a function of $D_t$ and $D_f$ of the corresponding DL DMRS configuration DMRS_i.

A result of Equation 3 may output an argument k that results in a largest value for the equation inside of the outermost (largest) set of parenthesis shown in Equation 3. The argument k that corresponds to the largest value may also correspond to the kth DL DMRS configuration DMRS_k. In some cases, two DL DMRS configurations that have the same SINR value may result in different outcomes for the equation inside of the outermost set of parenthesis shown in Equation 3—e.g., the one of the two DL DMRS configurations that uses additional resource elements may result in a smaller value. For similar reasons, a DL DMRS configuration that has a larger SINR may result in a smaller value than a DL DMRS configuration that has a smaller SINR. Similar equations may be used to determine which of the DL DMRS configurations will maximize other communication metrics for a channel. In some cases, the identified DL DMRS configuration may be different than the initial DL DMRS configuration configured by base station 205.

UE 215 may be configured to generate a CSF report based on the received and monitored CSI-RS resources. Thus, UE 215 may determine a value for a PMI, RI, CQI, and a DMRS configuration indicator (DMI). For the PMI and RI, UE 215 may select values that maximize the estimated average spectral efficiency. For the DMI, UE 215 may select a value corresponding to the DL DMRS configuration that maximizes a communication metric (e.g., effective spectral efficiency) for the channel—e.g., based on Equation 3. For the CQI, UE 215 may select a value based on a delay spread, a Doppler frequency, an average spectral efficiency associated with the selected PMI and RI, and a selected DL DMRS configuration. In some examples, the CSF report may include a PMI field, an RI field, a CQI field, and a DMI field that is configured to convey a DMI. In other examples, the CSF report may not include a DMI field explicitly. In such cases, UE 215 may jointly encode values determined for the CQI and DMI and use a joint CQI+DMI field to convey the jointly encoded information.

After generating the CSF report, UE 215 may transmit, using uplink 270, the CSF report to base station 205 in report 255. Report 255 may include DMRS configuration indication 250 based on the DL DMRS configuration selected by UE 215. Base station 205 may use report 255 to adapt transmission parameters for subsequent communications to UE 215. In some examples, base station 205 may transmit second DL DMRS 220 to UE 215 in accordance with the DL DMRS configuration indicated by DMRS configuration indication 250. In other examples, base station 205 may identify a group of DL DMRS configurations based on DMRS configuration indication 250 and may transmit second DL DMRS 220 in accordance with one of the DL DMRS configurations included in the group of DL DMRS configurations—the group of DL DMRS configurations may include the DL DMRS configuration indicated by DMRS configuration indication 250.

In some examples, an initial UL DMRS configuration may be configured for UE 215 during an RRC signaling exchange. The initial UL DMRS configuration may be associated with a first combination of a temporal spacing between resource elements allocated to an UL DMRS; a frequency spacing between resource elements allocated to an UL DMRS; and a power level used to transmit an UL DMRS resource element relative to a power level used to transmit data resource element—which may be represented as ($D''_t$, $D''_f$, $\rho''_p$). Thus, UE 215 may transmit UL DMRSs to base station 205 in accordance with the initial UL DMRS configuration. Base station 205 may be configured to determine a preferred UL DMRS configuration, as similarly described with reference to the operations that support a determination of a preferred DL DMRS configuration by UE 215. That is, base station 205 may identify an UL DMRS configuration that maximizes a communication metric based on a delay spread $\tau_{rms}$, a Doppler frequency $f_{D\_max}$, representative for the UL link and an estimated post-processing signal quality ratio $\gamma_{RS}$ of a reference signal transmitted by UE 215.

In such cases, base station 205 may generate, for different combinations of channel conditions (e.g., for different combinations of $\tau_{rms}$ and $f_{D\_max}$), a mapping between values determined for a link quality characteristic (e.g., post-processing SINR) estimated using a received reference signal and the corresponding equivalent values for the link quality characteristic corresponding to usage of UL DMRS transmissions having different UL DMRS configurations—e.g., during an offline training procedures. In some cases, base station 205 may generate the mapping between the applicable UL DMRS configurations. That is, base station 205 may determine, for each UL DMRS configuration, a difference in values calculated for a link quality characteristic using a first UL DMRS configuration ($\gamma_{UL\_DMRS}$) and a remaining set of UL DMRS configurations ($\gamma_{UL\_DMRS\_x}$). Additionally, or alternatively, base station 205 may generate the mapping between an SRS and the available UL DMRS configurations. In such cases, base station 205 may determine, for each SRS configuration, a difference in values calculated for a link quality characteristic using an SRS configuration ($\gamma_{SRS}$) and corresponding equivalent values for the link quality characteristic while using available UL DMRS configurations ($\gamma_{UL\_DMRS\_x}$). In either case, base station 205 may generate separate mappings for different reference signal configuration and for different combinations of $\tau_{rms}$, $f_{D\_max}$, and input SNR. Input SNR may be equivalent to a thermal noise variance component.

An example mapping for an UL DMRS may be provided by Table 3:

TABLE 3

| UL_DMRS_1(0, 0, 0); $\tau_{rms}$ = 1, $f_{D\_max}$ = 1; SNR = 1 | | |
|---|---|---|
| UL DMRS Configuration ($D_t$, $D_f$, $\rho_p$) | | $\gamma_{UL\_DMRS\_x}$ |
| UL_DMRS_2 | (0, 0, 1) | $f_2(\gamma_{UL\_DMRS\_1})$ |
| UL_DMRS_3 | (0, 1, 1) | $f_3(\gamma_{UL\_DMRS\_1})$ |
| ... | ... | ... |
| UL_DMRS_N | (x, y, z) | $f_n(\gamma_{UL\_DMRS\_1})$ |

An example mapping for an SRS may be provided by Table 4:

TABLE 4

| SRS_1; $\tau_{rms}$ = 1, $f_{D\_max}$ = 1; SNR = 1 | | |
|---|---|---|
| UL DMRS Configuration ($D_t$, $D_f$, $\rho_p$) | | $\gamma_{DMRS\_x}$ |
| UL_DMRS_1 | (0, 0, 0) | $f_1(\gamma_{SRS\_1})$ |
| UL_DMRS_2 | (0, 0, 1) | $f_2(\gamma_{SRS\_1})$ |
| UL_DMRS_3 | (0, 1, 1) | $f_3(\gamma_{SRS\_1})$ |
| ... | ... | ... |
| UL_DMRS_N | (x, y, z) | $f_n(\gamma_{SRS\_1})$ |

Base station 205 may use the mapping and an SINR value calculated for a received reference signal ($\gamma_{RS}$) to estimate SINR values for each of the available UL DMRS configurations ($\gamma_{UL\_DMRS\_x}$). Base station 205 may then use the calculated SINR values to determine an UL DMRS configuration that provides a maximum value for an effective spectral efficiency metric. For example, base station 205 may determine the UL DMRS configuration that maximizes effective spectral efficiency for the channel based on Equation 4:

$$\operatorname*{argmax}_{i=1:N}\left(N_{RE\_data}(\text{UL\_DMRS\_i}) \cdot \sum_{l=1:R} C_{QAM}(\bar{\gamma}_l(\text{UL\_DMRS\_i}))\right)$$

where $C_{QAM}$ may be the constrained capacity function for a maximum relevant modulation scheme (e.g., for a QAM order) that gives the estimated average spectral efficiency per resource element; $N_{RE\_data}$ may be the number of data resource elements per resource allocation (or per resource block); UL_DMRS_i may be the UL DMRS configuration defined by a combination of ($D_t$, $D_f$, $\rho_p$); and $\bar{\gamma}_l$(UL_DMRS_i) may be the average post-processing SINR for a corresponding UL DMRS configuration UL_DMRS_i. $N_{RE\_data}$ may be a function of $D_t$ and $D_f$ of the corresponding UL DMRS configuration UL_DMRS_i.

Base station 205 may configure UE 215 to use the determined UL DMRS configuration, and UE 215 may transmit a subsequent UL DMRS (e.g., UL DMRS 260) to base station 205 based on the indicated UL DMRS configuration. For example, UE 215 may transmit UL DMRS 260 in accordance with the indicated UL DMRS configuration or in accordance with an UL DMRS configuration that is a part of a group that includes the indicated UL DMRS configuration.

Thus, base station 205 may use Equation 4 (or a similar equation) to determine a convenient UL DMRS configuration for UE 215. As discussed, the estimated equivalent post-processing SINR values input into Equation 4 may be a function of (e.g., based on) the delay spread $\tau_{rms}$, Doppler frequency $f_{D\_max}$, input SNR of the uplink channel, and the estimated post-processing SINR based on a specific SRS or UL DMRS allocation/configuration. For example, base station 205 may use uplink delay spread $\tau_{rms}$, uplink Doppler frequency $f_{D\_max}$, and uplink input/reception SNR measured in SRS or the used DMRS configuration as bases for estimating the SINR values for the available UL DMRS configurations ($\gamma_{UL\_DMRS\_x}$). So, the ability of base station 205 to select an appropriate UL DMRS configuration for UE 215 may be dependent on, or improve with, the ability of base station 205 to reliably determine/estimate the delay spread, Doppler frequency, and input SNR of the uplink channel.

To determine the delay spread, base station 205 may measure an SRS used for a link adaption procedure for the uplink channel. Base station 205 may also measure an SRS to determine the reception SNR for the uplink channel. To determine the Doppler frequency for the uplink channel, in some cases base station 205 may measure an SRS or a DMRS with convenient configuration (e.g., repetition of two transmissions from the same antenna port, the same beam or quasi-collocated beams on two symbols with appropriate spacing in time). However, as described herein, the SRS and DMRS may be unsuitably configured for Doppler frequency estimation. For example, the spacing between repetitions of the SRS may be limited and may only be appropriate for Doppler frequency estimation in some scenarios (e.g., certain pairing of carrier frequency, subcarrier spacing, and a limited Doppler range). And the spacing between repetitions of the DMRS may be too inconsistent (e.g., due to PUSCH scheduling variability) to support reliable Doppler frequency estimation.

So, in some examples, base station 205 may improve Doppler frequency estimation by configuring UE 215 to use an SRS configuration that has an appropriate repetition spacing tailored to the deployment scenario (e.g., carrier frequency, sub carrier spacing). Once the SRS repetition spacing is consistent and tailored to the communications parameters, base station 205 may use the SRS to reliably estimate the Doppler frequency for the uplink channel. Once determined, the uplink Doppler frequency may be used by base station 205, along with other factors, to select an appropriate UL DMRS configuration for UE 215 that allows an increase in the spectral efficiency of the link.

Figure 3:
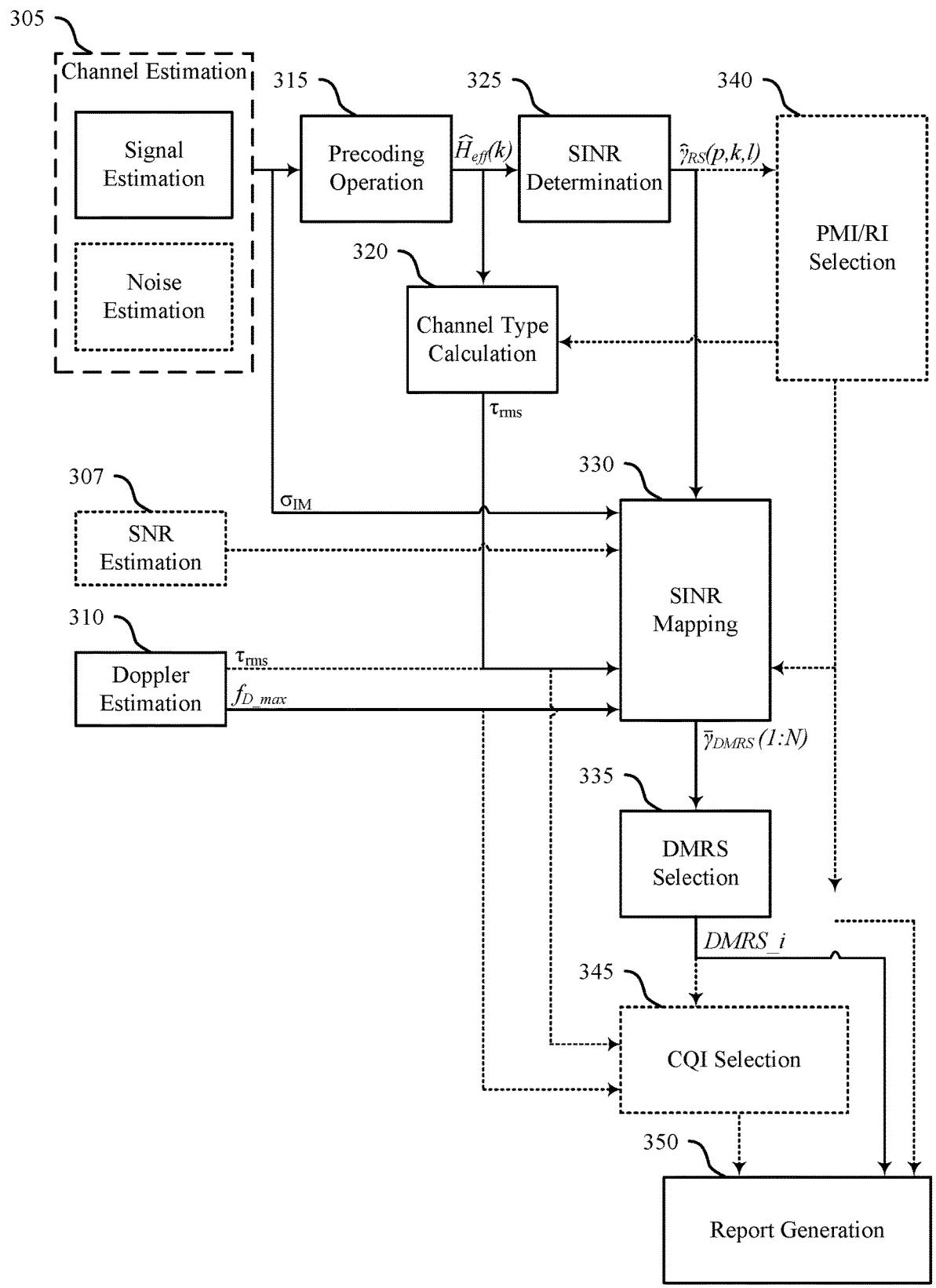
FIG. 3 illustrates a collection of operations that support demodulation reference signal configuration selection in accordance with various aspects of the present disclosure.

FIG. 3 illustrates a collection of operations that support demodulation reference signal configuration selection in accordance with various aspects of the present disclosure. Process flow 300 may be performed by a base station or a UE, such as base station 205 or UE 215 of FIG. 2.

Process flow 300 illustrates an exemplary collection of operations performed to support the selection of a DMRS configuration. For example, process flow 300 depicts internal signaling that may be exchanged and internal processing that may be performed to support selecting a DMRS configuration. Process flow 300 may be related to a process for using reference signals to determine channel characteristics that may be in turn be used to determine preferred transmission parameters, such as a preferred DMRS configuration, precoding matrix, rank, and MCS.

One skilled in the art would understand that one or more of the operations described in process flow 300 may be performed earlier or later in the process, omitted, replaced, supplemented, or any combination thereof. Also, additional operations described herein that are not included in process flow 300 may be included.

At block 305, a wireless device (e.g., a base station or UE) may obtain an estimate of a channel between a transmitting device and the receiving device. Estimating the channel may include an estimation of the channel based on a reference signal (e.g., based on CSI-RS, UL DMRS, and/or SRS). Estimating the channel may also include an estimation of a noise component of channel based on an interference management resource (e.g., based on a CSI-IM resource)—e.g., if the wireless device is a UE. When the noise estimation free of channel estimation error can be obtained, the wireless device may use Equation 2 to estimate post-processing SINR. When noise estimation cannot be obtained free of channel estimation error component, the wireless device may use Equation 1 to estimate post-processing SINR. The channel estimate may be represented using a channel matrix.

At block 307, the wireless device may estimate an input SNR for the channel—e.g., if the wireless device is a base station. The wireless device may estimate the input SNR to assist in post-processing SINR mapping as an alternative to using thermal noise and interference variance estimated in block 305—e.g., if the wireless device is a base station.

At block 310, the wireless device may obtain an estimate of a Doppler frequency of the channel. The wireless device may estimate the Doppler frequency based on a received reference signal. For example, if the wireless device is a UE, the wireless device may estimate the Doppler frequency for the downlink channel based on a DMRS or a TRS. If the wireless device is a base station, the wireless device may estimate the Doppler frequency for the uplink channel based on a specially configured SRS, as described herein and with reference to FIGS. 5 and 7. Or the base station may determine the Doppler frequency for the uplink channel based on the Doppler frequency for the downlink channel, as described herein and with reference to FIGS. 6 and 7. In some cases, the wireless device may also determine a delay spread based on the received reference signal (e.g., the DMRS, TRS, or SRS).

At block 315, the wireless device may generate one or more channel matrices based on different combinations of the tested precoding matrices and rank hypothesis. The wireless device may generate one or more effective channel matrices based on applying the different combinations of precoding matrices and rank hypothesis to the channel estimate determined during the channel estimation operation.

At block 320, the wireless device may classify the channel based on one or more of the effective channel estimates obtained after applying the tested precoding operation—e.g., the channel may be classified as an urban or rural channel. The wireless device may also determine a delay spread for the channel based on the effective channel estimates. In some examples, the delay spread is determined for an effective channel estimate that corresponds to a precoding matrix and rank that have been selected for the channel to optimize link efficiency.

At block 325, the wireless device may determine one or more post-processing signal quality ratios (e.g., SNR or SINR) based on the effective channel matrices obtained after applying a precoding operation. In some cases, the precoding operation may be omitted—e.g., if a received reference signal is already precoded. In some cases, the wireless device may determine, for each stream l, each resource element k, and each precoding matrix p, a signal quality ratio $\hat{\gamma}_{RS}(p, k, l)$. The one or more signal quality ratios may be determined based on Equation 1—e.g., if the wireless device does not obtain a noise estimate that is free of a channel estimation error component. Additionally, or alternatively, the one or more signal quality ratios may be determined based on Equation 2—e.g., if the wireless device is a UE and based on CSI-RS and CSI-IM resources.

At block 330, the wireless device may execute a mapping from an SINR computed for a received reference signal (e.g., a CSI-RS, UL DMRS, or SRS) to multiple SINRs estimated for a set of DMRS configurations. The estimated SINRs may be represented as $\bar{\gamma}_{DMRS}(1: N)$. As described herein and with reference to FIG. 2, the wireless device may identify a mapping based on an indication of a first set of characteristics for the channel (e.g., a combination of a delay spread $\tau_{rms}$, Doppler frequency $f_{D\_max}$, and/or noise variance $\tilde{\sigma}_{IM}^2$ if the wireless device is a UE, or a combination of a delay spread $\tau_{rms}$, Doppler frequency $f_{D\_max}$, and/or reception SNR if the wireless device is a base station) and a configuration of the received reference signal having a combination of a temporal spacing, frequency spacing, and power boosting. The Doppler frequency may be determined based on the Doppler estimation. And the noise variance may be determined based on the noise estimation.

Before executing the mapping, the SINRs computed for the received reference signal ($\hat{\gamma}_{RS}(p, k, l)$) may be averaged some way across the set of resource elements k for each stream l and precoding matrix p. To compute the SINR for the received reference signal, the wireless device may average a set of SINRs computed for different resource elements, on a per stream basis and in accordance with a selected precoding matrix and rank. In some cases, an indication of the precoding matrix and rank is provided to the SINR mapping operation based on a prior or concurrent determination of the precoding matrix and rank. The SINR mapping operation may use the indicated precoding matrix and rank to determine which version of SINR estimates determined at block 325 to use for the SINR mapping.

At block 335, the wireless device may select one of the DMRS configurations. The wireless device may select the DMRS configuration of the DMRS configurations that maximizes a communication metric for the channel, such as effective spectral efficiency—e.g., based on Equation 3 or 4. That is, the wireless device may select the DMRS configuration, DMRS_i, that yields a larger value for the communication metric than the other DMRS configurations.

At block 340, the wireless device may determine a precoding matrix and rank that increase a spectral efficiency of the channel—e.g., based on the determined signal quality ratios. As described herein, the selected precoding matrix and rank may be used by the SINR mapping operation to determine an average estimated SINR for a received reference signal that corresponds to a selected precoding matrix and rank. The wireless device may also determine a spectral efficiency for the channel based on the selected precoding matrix and rank selection. In some cases, the precoding matrix and rank selection operation is not performed.

At block 345, the wireless device may determine a value of a recommended CQI. The CQI determination may be based on the delay spread $\tau_{rms}$, Doppler frequency $f_{D\_max}$, and DMRS configuration DMRS_i (which may be a configured to a UE or the selected DL DMRS configuration). The CQI determination may also be based on an indication of spectral efficiency for the channel determined during the precoding matrix and rank selection operation. In some cases, the wireless device determines a value for the CQI that is associated with an MCS that is optimized for the selected DMRS configuration and channel conditions.

In some cases, the CQI selection operation is replaced by MCS selection—e.g., if the wireless device is a base station.

At block 350, the wireless device may generate a report (e.g., CSF report if the wireless device is a UE) that includes an indication of the selected DMRS configuration (e.g., a DL DMRS configuration). In some examples, generating the report includes generating a CSF report that includes a PMI, RI, CQI, and DMI. In some cases, the CSF report may include a DMI field that is used to convey the DMI. A size of the DMI field may be based on a quantity of DMRS configurations that are tested/available for communications. In other cases, the CSF report may jointly encode the CQI and DMI based on a relationship between CQI values and DMRS configurations. The jointly encoded CQI and DMI may be conveyed by a CQI field or a combined CQI/DMI field. By including the encoded CQI and DMI in a CQI field or a new field, a CSF reporting format may be unchanged while being used to convey additional data and overhead signaling may be reduced using joint CQI and DMI coding. In some examples, generating the report includes generating a control message that directs the transmitting device to use the indicated DMRS configuration for subsequent transmissions—e.g., if the wireless device is a base station.

The wireless device may transmit the report to a transmitting device. When the report includes or is a CSF report, a transmitting device may adapt transmission parameters based on the received CSF report.

Figure 4:
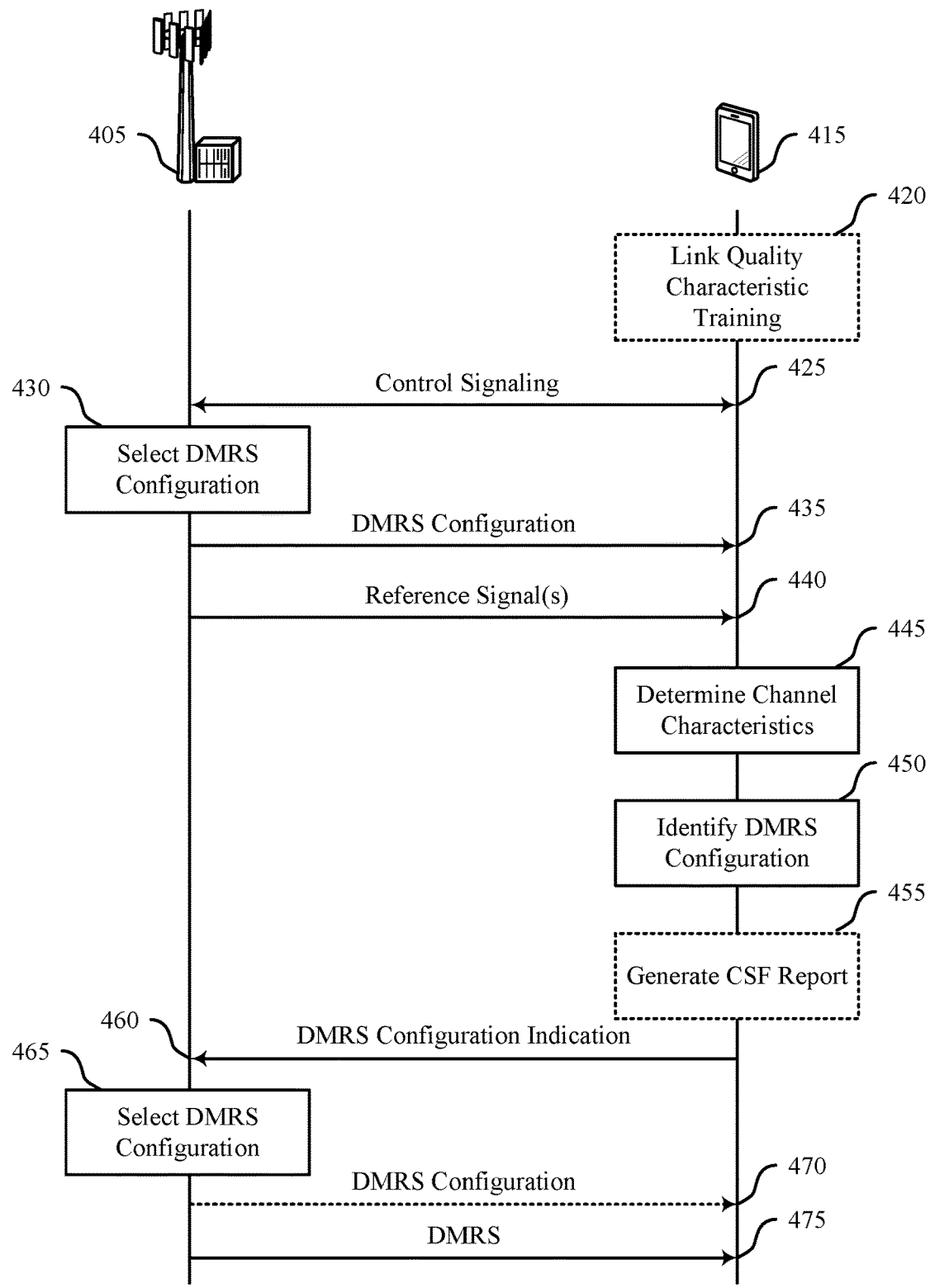
FIG. 4 illustrates a collection of operations that support demodulation reference signal configuration selection in accordance with various aspects of the present disclosure.

FIG. 4 illustrates a collection of operations that support demodulation reference signal configuration selection in accordance with various aspects of the present disclosure. Process flow 400 may be performed by base station 405 and UE 415, which may be examples of base station 205 and UE 215 of FIG. 2.

Process flow 400 illustrates an exemplary collection of operations performed to support the selection of a DL DMRS configuration. For example, process flow 400 depicts signaling that may be exchanged and processing that may be performed to support selecting a DL DMRS configuration. Process flow 400 may be related to signaling preferred transmission parameters, such as a preferred DL DMRS configuration, precoding matrix, rank, and MCS, to a transmitting device.

At block 420, an offline numerical training procedure may be performed for UE 415. Based on the training procedure, one or more mappings that indicate previously determined differences in values computed for a link quality characteristic determined using reference signal transmissions of a first type (e.g., CSI-RS) and reference signal transmissions of a second type (e.g., DMRS) may be generated, as described herein and with reference to FIG. 2.

At arrow 425, base station 405 and UE 415 may exchange control signaling (e.g., RRC signaling). UE 415 may signal a capability for selecting DL DMRS configurations. Additionally, or alternatively, base station 205 may transmit a message that directs UE 415 to use a CSF reporting format that supports indicating a DMRS configuration (e.g., by using a CSF reporting format with an additional field).

At block 430, base station 405 may select an initial DL DMRS configuration for UE 415.

At arrow 435, base station 405 may signal the initial DL DMRS configuration to UE 415. And UE 415 may determine that DL DMRS will be transmitted in accordance with the initial DL DMRS configuration.

At arrow 440, base station 405 may transmit one or more reference signals to UE 415. Base station 405 may transmit any combination of DL DMRS, CSI-RS, and TRS to UE 415. The DL DMRS may be included as part of a PDSCH that is also transmitted at arrow 435. Base station 405 may transmit a DL DMRS in accordance with the initial DL DMRS configuration. Base station 405 may transmit a CSI-RS in accordance with a configured CSI-RS configuration. Base station 405 may be prohibited from transmitting over interference management resources (e.g., ZP CSI-IM resources).

At block 445, UE 415 may use the reference signals to determine channel characteristics and/or reception characteristics for a downlink channel between base station 405 and UE 415, as described herein and with reference to FIG. 3. For example, UE 415 may determine a channel matrix, delay spread, noise variance, and SINR based on a received CSI-RS and a monitored CSI-IM resource. UE 415 may determine a Doppler frequency, and delay spread based on a received TRS. UE 415 may also determine reception characteristics for the downlink channel (reception SNR).

At block 450, UE 415 may identify a DL DMRS configuration that maximizes a communication metric for a data channel relative to other DL DMRS configurations, as described herein and with reference to FIG. 3. UE 415 may use the determined channel characteristics, reception characteristics, and identified DL DMRS configuration to determine additional transmission characteristics (e.g., channel quality/CQI) for the downlink channel (e.g., the downlink data channel).

At block 455, UE 415 may generate a CSF report that includes a PMI, RI, CQI, SLI, and DMI. A value for the DMI may be determined based on the identified DL DMRS configuration. For example, UE 415 may set DMI to a value that corresponds to the identified DL DMRS configuration or to a group of DL DMRS configurations that include the DL DMRS configuration. A value for the CQI may be determined based on the identified DL DMRS configuration, PMI, RI, or any combination thereof. In some cases, the DMI may be included in a DMI field of the CSF report.

In other cases, the DMI may be jointly encoded with the CQI and included in a CQI field of the CSF report (or alternatively in a new CQI/DMI field of the CSF report). That is, in some cases, a subset of DMRS configurations may be associated with a particular CQI value—e.g., based on a relationship between a DMRS configuration and a CQI value for a specific reception conditions. Thus, when joint encoding is used, a value that corresponds to one or more DMRS configurations may also corresponds to a CQI value—e.g., DMRS_2, DMRS_3, and DMRS_5 may correspond to CQI value 1, DMRS_1 and DMRS_4 may correspond to CQI value 2, and so on.

At arrow 460, UE 415 may transmit an indication of the selected DL DMRS configuration to base station 405. In some cases, the indication may be included in a CSF report that is transmitted by UE 415 to base station 405. Base station 405 may decode the CSF report to determine a value of the signaled PMI, RI, SLI, CQI, and DMI.

At block 465, base station 405 may select a DL DMRS configuration based on the DMI included in the CSF report. In some cases, base station 405 may select a DL DMRS configuration that corresponds to the DL DMRS configuration indicated by the DMI. In some cases, base station 405 may select a DL DMRS configuration based on the DL DMRS configuration indicated by the DMI—e.g., a DL DMRS configuration that is included in a group of DL DMRS configurations that includes the indicated DL DMRS configuration.

At arrow 470, base station 405 may signal the selected DL DMRS configuration to UE 415. Base station 405 may signal the selected DL DMRS configuration in a downlink control information (DCI) message or in MAC signaling or in a combination of both of them while some list of equivalent DMRS configurations is first activated using MAC-CE and then one of them is complementary selected by each scheduling DCI.

At arrow 475, base station 405 may transmit a DL DMRS to UE 415 in accordance with the selected DL DMRS configuration.

Figure 5:
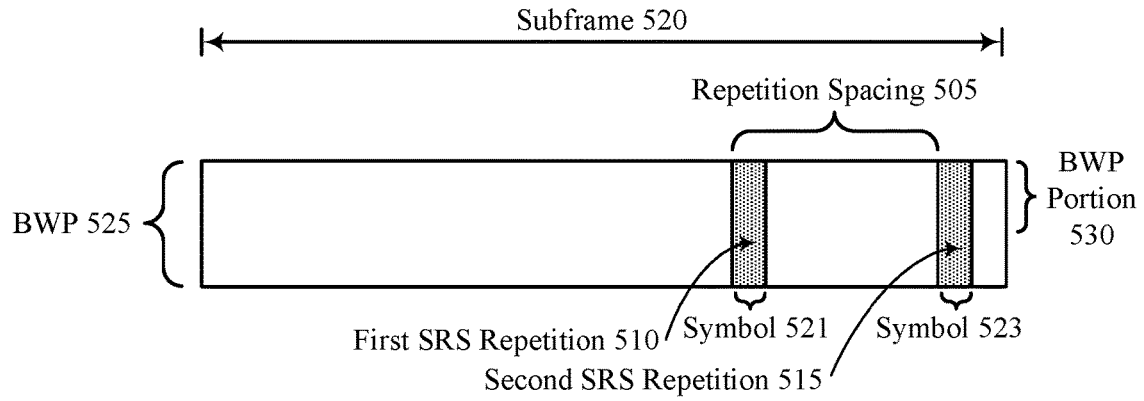
FIG. 5 illustrates aspects of sounding reference signal configurations that support demodulation reference signal configuration selection in accordance with various aspects of the present disclosure.
Figure 5:
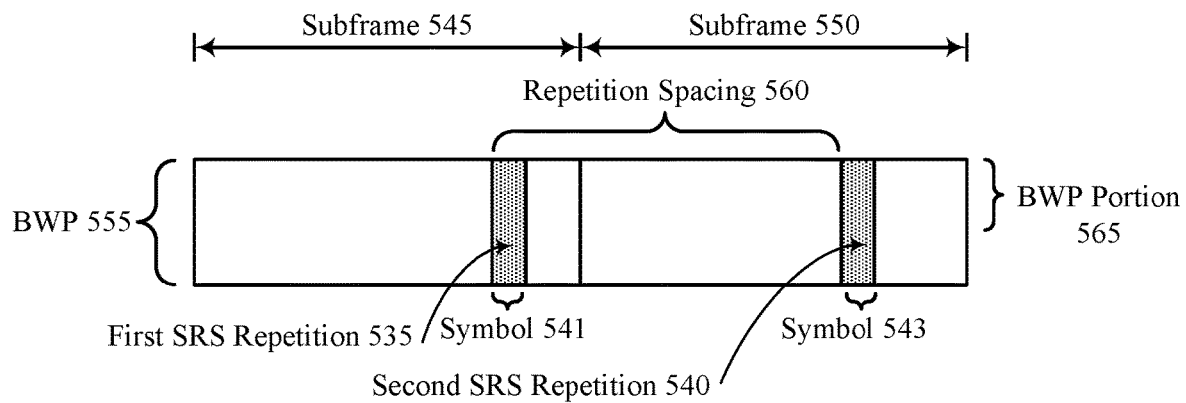
Figure 6:
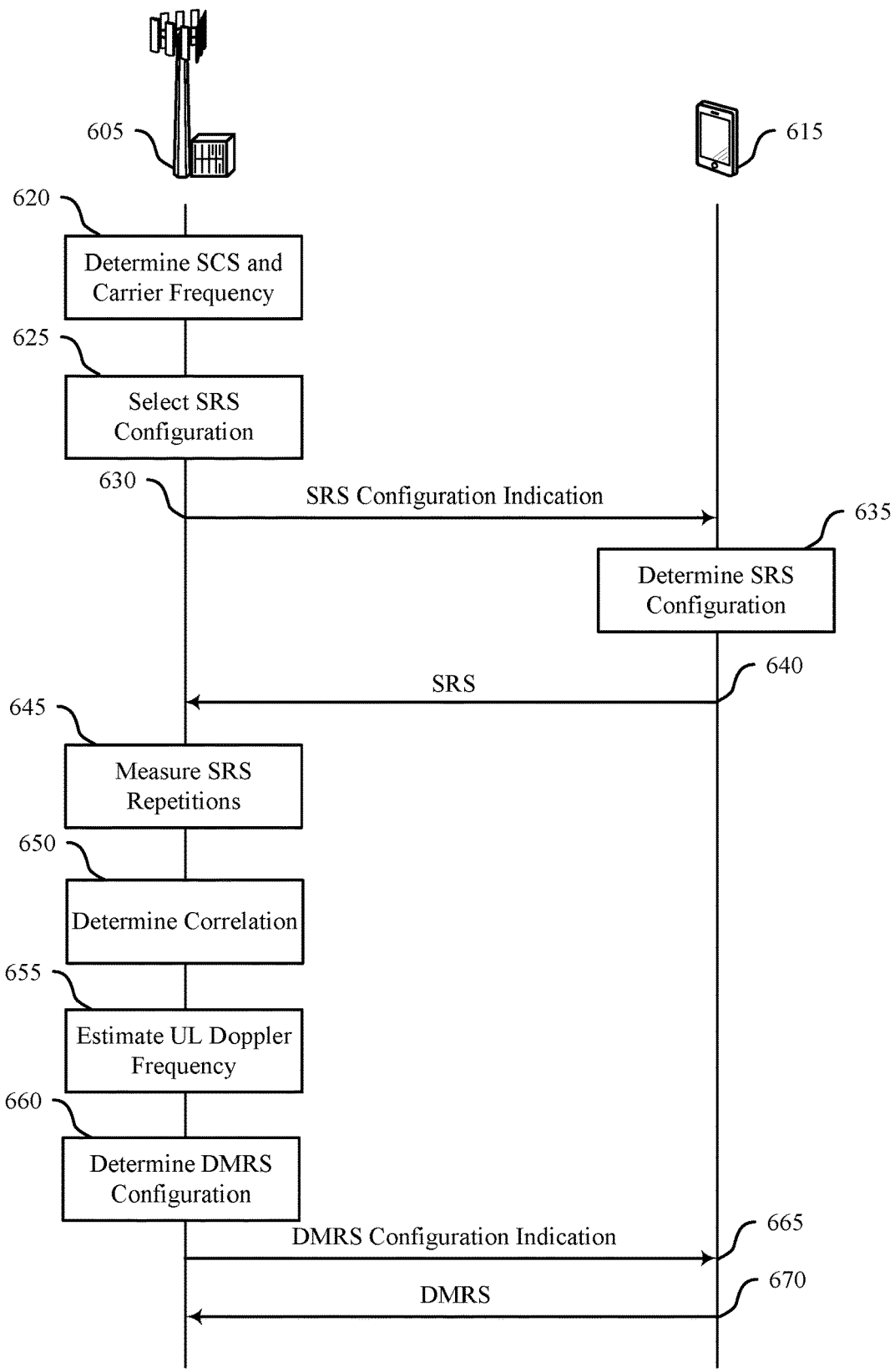
FIGS. 6 and 7 illustrate process flows that support demodulation reference signal configuration selection in accordance with various aspects of the present disclosure.
Figure 7:
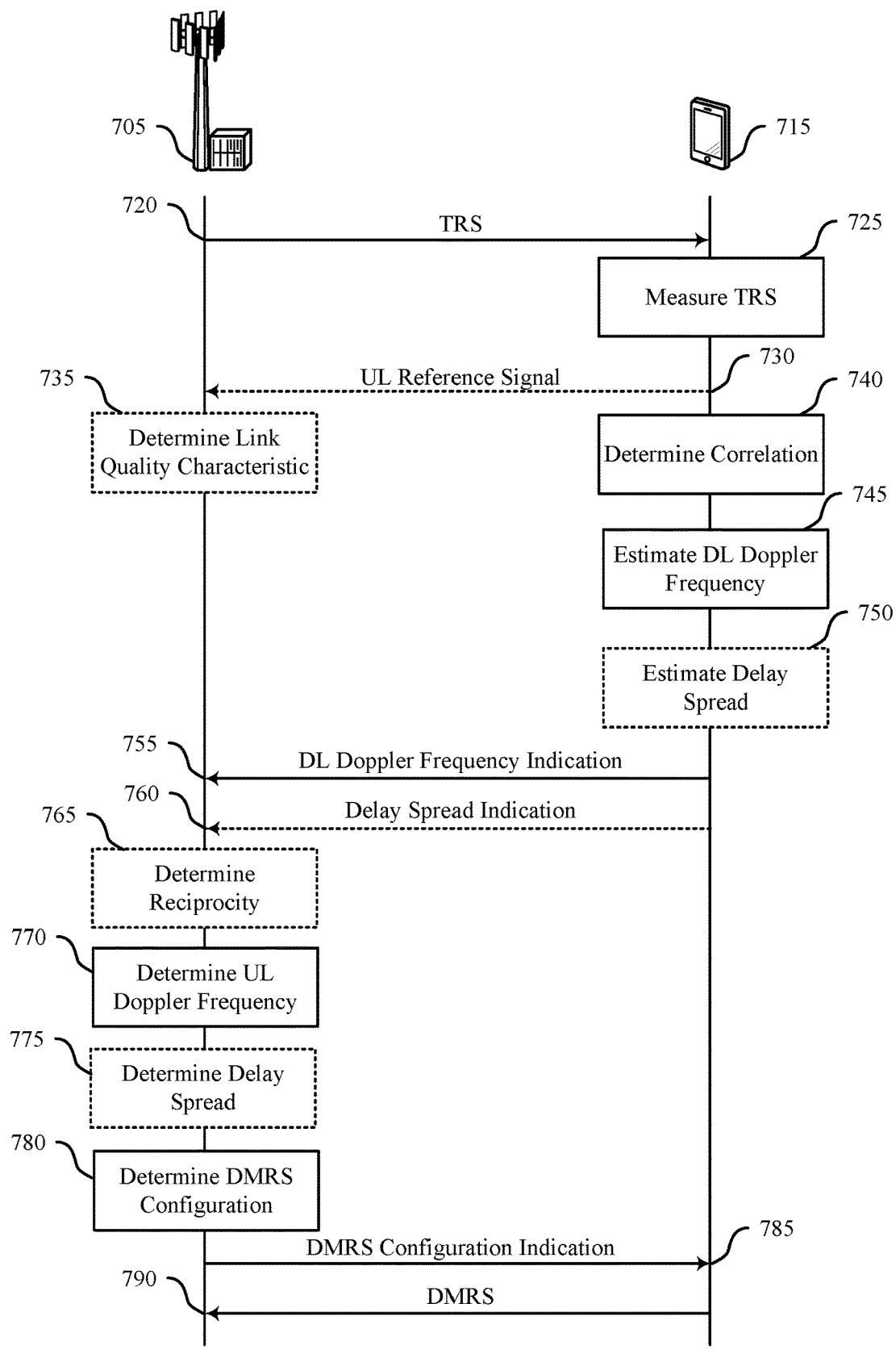

Although described with reference to selection of a DL DMRS configuration, various aspects of process flow 400 may be implemented to select an UL DMRS configuration. For example, the transmission of reference signals at arrow 440 and the transmission of DMRS at arrow 475 may be performed by UE 415, and the operations at block 445, block 450, and arrow 460 may be performed by base station 405. In order to perform the operations at block 445 and block 450, base station 405 may perform at least a portion of the operations described herein and with reference to FIG. 3 (e.g., the operations described at block 305 through block 340). Base station 405 may also determine various characteristics of the uplink channel, including Doppler frequency. FIGS. 5 through 7 describe various methods a base station can use to determine the Doppler frequency for the uplink channel.

FIG. 5 illustrates aspects of SRS configurations 500 that support demodulation reference signal configuration selection in accordance with various aspects of the present disclosure. The SRS configurations 500 may include SRS configuration 500-$a$ and SRS configuration 500-$b$, which may be examples of SRS configurations implemented in a wireless communications system. For example, the SRS configurations 500 may represent SRS configurations that are selected by a base station for use by a UE.

As noted, a base station may use uplink Doppler frequency, among other factors, as a basis for selecting an appropriate uplink DMRS configuration that allows an increase in the spectral efficiency of the link. The term Doppler frequency may refer to a frequency spread or maximal Doppler shift in a signal due to movement of the transmitting device in conjunction with Rayleigh fading channel. In some examples, the base station may determine the Doppler frequency for an uplink channel based on the correlation in time between two repetitions of an uplink reference signal. The correlation in time (also referred to as "correlation") between two repetitions of a reference signal may be determined by measuring certain corresponding aspects of two repetitions of a reference signal.

Repetitions of a reference signal may refer to repeated transmissions of the same reference signal. In some examples (e.g., when referring to SRS), repetitions of a reference signal may be referred to herein as pilots or pilot signals, and the resources used to carry the pilot signals (or reserved for carrying the pilot signals) may be referred to as pilot resources or pilot symbols. The temporal spacing between reference signal repetitions may be referred to herein as repetition spacing, pilot spacing (e.g., for SRS), or a reference signal spacing configuration, or other suitable terminology.

To increase the accuracy of a Doppler frequency estimation, a base station may average the correlations of multiple pairs of reference signals that share a common repetition spacing. However, such a technique may be ineffective if the repetition spacing between pairs of reference signals is inconsistent and may not always be convenient for reliable estimation of a reasonable Doppler range.

The suitability of repetition spacing for Doppler frequency estimation may vary with the communication parameters used by the UE. For example, the repetition spacing that is suitable for Doppler frequency estimation may vary with the subcarrier spacing and carrier frequency used by the UE to transmit the reference signal. The subcarrier spacing and carrier frequency used by a UE may be configured for the UE by the network based on capabilities of the UE. A repetition spacing may be considered suitable for Doppler frequency estimation if the resulting correlation between reference signal repetitions is within an acceptable threshold range, e.g., between 0.5 and 1 (which means that the resulting Doppler frequency estimation can be done reliably). Table 5 provides an example of suitable repetition spacing for a reference signal given certain non-limiting pairings of subcarrier spacing and carrier frequency. The term subcarrier spacing may refer to the frequency gap between subcarriers used for communications between a base station and a UE. The term carrier frequency may refer to the frequency band used for communications between a base station and a UE.

TABLE 5

| Pilot Spacing | Subcarrier Spacing | Carrier Frequency |
|---|---|---|
| 3-4 symbols | 15 kHz | 6 GHz |
| 6-7 symbols | 30 kHz | 6 GHz |
| 12-13 symbols | 60 kHz | 6 GHz |

In some examples, a base station may estimate the uplink Doppler frequency for a channel by measuring DMRS or SRS. For example, the base station may measure two DMRS repetitions to determine the uplink Doppler frequency, or the base station may measure two SRS repetitions to determine the uplink Doppler frequency. But Doppler frequency estimation using DMRS may be inaccurate because the spacing between DMRS repetitions varies with PUSCH allocations, which results in unreliable or inconsistent correlation values. Or there may be only one DMRS repetition, which prevents correlation altogether. And the suitability of SRS for Doppler frequency estimation may be limited to certain communication scenarios (e.g., limited to a subset of possible subcarrier spacing and carrier frequency pairings) because the system only supports a limited quantity of SRS repetition spacing options.

For example, an SRS configuration supported by the system may include four SRS repetitions transmitted consecutively (e.g., transmitted in consecutive SRS symbols). Thus, the maximum spacing between SRS repetitions may be three symbols, which means the SRS configuration may be suitable for Doppler estimation when the UE uses a subcarrier spacing of 15 kHz and a carrier frequency of 6 GHz, but not when the UE uses other combinations of subcarrier spacing and carrier frequency. As another example, an SRS configuration supported by a base station and UE may include two SRS repetitions transmitted in the last symbol of the first subframe and in the first valid SRS location of the next subframe (e.g., two consecutive uplink subframes). Thus, the minimum spacing between SRS repetitions may be nine symbols (assuming a fourteen-symbol subframe), which means this SRS configuration may be unsuitable for Doppler estimation when the UE uses any combination of subcarrier spacing and carrier frequency in Table 5.

So, in certain circumstances, a base station may estimate uplink Doppler frequency by measuring uplink SRS or DMRS repetitions. For instance, the base station may decide to estimate the uplink Doppler frequency by measuring SRS repetitions if the base station determines that the SRS repetition spacing is suitable for the subcarrier spacing and carrier frequency in use by the UE. As another example, the base station may decide to estimate the uplink Doppler frequency by measuring DMRS repetitions when the base station determines that the DMRS repetition spacing will be relatively consistent (e.g., based on PUSCH allocations). Or the base station may decide to estimate the uplink Doppler frequency by measuring DMRS repetitions when the base station determines that an inaccurate estimation is permitted. But as described above, even though the base station controls DMRS and SRS configurations (and allocations for a UE), in some cases the base station may be unable to tailor all relevant aspects needed for reliable uplink Doppler frequency estimation.

But in some scenarios, a base station may wish to further improve the accuracy of a Doppler frequency estimation (e.g., to improve the DMRS configuration selection). In such scenarios, the base station may estimate the uplink Doppler frequency by using an SRS configuration with a repetition spacing that suits the subcarrier spacing and carrier frequency used by the UE. For example, the base station may instruct a UE to use SRS configuration 500-a or SRS configuration 500-b, which may define (or be associated with) a repetition spacing (e.g., repetition spacing 505 or repetition spacing 560, respectively) that is suited to a particular combination of subcarrier spacing and carrier frequency. The base station may configure the SRS for the Doppler frequency estimation instead of the DMRS because the timing of SRS repetitions is independent of PUSCH scheduling and thus more flexible. In some examples, each SRS repetition may occupy a set of resource elements (e.g., contiguous resource elements) in a symbol, and the resource elements for different repetitions may span the same frequency band.

SRS configuration 500-a may define (or be associated with) a repetition spacing 505 that is the temporal spacing between SRS repetition symbols (e.g., symbols used for repetitions of the SRS). Thus, the repetition spacing 505 may be in the time domain and may be measured in time (e.g., milliseconds) or quantity of symbols—e.g., the time correlation may be measured in terms of OFDM symbols post fast Fourier transform (FFT). The repetition spacing 505 may be between a first repetition of the SRS (e.g., in a first symbol) and a second repetition of the SRS (e.g., in a second symbol). For example, the repetition spacing 505 may separate the first SRS repetition 510 and the second SRS repetition 515, which may be transmitted in symbol 521 and symbol 523, respectively. The repetitions of the SRS may be in the same uplink resource, which may be a subframe 520. In some examples, the SRS repetitions may span the entire bandwidth part 525 configured for the UE. In other examples, the SRS repetitions may span a portion (e.g., BWP portion 530) of the bandwidth part configured for the UE (e.g., so that SRS repetitions from other UEs can be multiplexed in the same subframe). In such examples, the base station may change the portion of the bandwidth part allocated to the SRS repetitions (e.g., based on channel information from a link adaption procedure).

SRS configuration 500-*b* may also define (or be associated with) a repetition spacing 560, which may be for SRS repetitions in different subframes (e.g., consecutive subframes). For example, the repetition spacing 560 may be between a first repetition of the SRS (e.g., first SRS repetition 535) in a first resource (e.g., subframe 545) and a second repetition of the SRS (e.g., second SRS repetition 540) in a second resource (e.g., subframe 550). The first SRS repetition 535 may be transmitted in a first symbol location (e.g., symbol 541) in subframe 545 and the second SRS repetition 540 may be transmitted in a second symbol location (e.g., symbol 543) in subframe 550. In some examples, the SRS repetitions may span the bandwidth part 555 configured for the UE. In other examples, the SRS repetitions may span a portion (e.g., BWP portion 565) of the bandwidth part configured for the UE (e.g., so that SRS repetitions from other UEs can be multiplexed in the same subframes). In such examples, the base station may change the portion of the bandwidth part allocated to the SRS repetitions (e.g., based on channel information from a link adaption procedure).

The SRS repetitions shown in the SRS configurations 500 may be transmitted using a single port (e.g., antenna port, SRS port) or multiple ports (e.g., multiple antenna ports, multiple SRS ports). When multiple ports are used, the ports may be quasi-collocated to facilitate Doppler frequency estimation. In the case of beam-based transmissions, the SRS repetitions may be transmitted using the same transmission beam and the same antenna panel. In some examples, only the last six symbols of a subframe are permitted to be allocated for SRS repetitions. In other examples, any symbol of a subframe can be allocated for an SRS repetition.

The SRS configurations 500 may be included in a set of multiple SRS configurations supported by the base station and a UE, which may be referred to as candidate SRS configurations. Each SRS configuration may define (or be associated with) a temporal spacing between SRS repetition symbols for an associated subcarrier spacing and carrier frequency (e.g., each SRS may have an associated repetition spacing). Supporting multiple SRS configurations may allow the base station to select an SRS configuration that is tailored to the communication parameters configured for (and therefore used by) the UE, among other parameters. For example, a base station may select SRS configuration 500-*a* or SRS configuration 500-*b* from the set of SRS configurations when the subcarrier spacing and carrier frequency used by the UE matches the subcarrier spacing and carrier frequency associated with SRS configuration 500-*a* or SRS configuration 500-*b*. Selecting an SRS configuration may refer to a base station scheduling a UE to transmit SRS according to the SRS configuration (e.g., scheduling the UE to transmit SRS repetitions in symbol locations with a temporal spacing associated with the SRS configuration). In some examples (e.g., when SRS resources are in the same subframe), an SRS configuration may be a dedicated SRS configuration that is predefined at the base station. In some examples (e.g., when SRS resources are in consecutive subframes), an SRS configuration may be or involve a forced scheduling of consecutive uplink subframes with SRS resources (which may not otherwise occur absent the uplink Doppler frequency estimation procedure).

If the communication parameters configured for the UE change, the base station may reconfigure the SRS repetition spacing accordingly (e.g., the base station may select from the set of candidate SRS configurations a new SRS configuration that is suited for the new communication parameters).

Similarly, the base station may select a different SRS configuration for a UE that is configured with different communication parameters.

In addition to being based on subcarrier spacing and carrier frequency, the suitability of repetition spacing may be based on the capability of the UE (e.g., the capability to support one or more SRS configurations as described herein, the capability to support a repetitive pattern of an SRS signal with a particular spacing between repetitions and phase coherency between the repetitions), the type of UE, or the mobility status of the UE, among other factors. Accordingly, a base station may select an SRS configuration based on these additional factors. For example, the base station may select an SRS configuration based on an ability of the UE to support high speed train conditions or based on the UE's movement or velocity. Additionally, or alternatively, the base station may select an SRS configuration based on the cell type or environment associated with the base station (e.g., the base station may select an SRS configuration based on the cell being an indoor cell or an outdoor cell serving UEs on a highway).

In some examples, a base station may select SRS configurations on a per-UE basis. For example, the base station may select for each UE served by the base station an SRS configuration specific to that UE. Alternatively, the base station may select SRS configurations for sets of UEs grouped according to one or more common characteristics.

So, in a first example, a base station may determine an accurate uplink Doppler frequency estimation by measuring an SRS that has been configured with a repetition spacing tailored to the communication parameters of the transmitting UE. In a second example, a base station may determine an accurate Doppler frequency estimation by leveraging reciprocity between the downlink channel and the uplink channel.

For example, the base station may determine that certain reciprocity conditions justify an assumption that that the uplink Doppler frequency is equivalent, or nearly equivalent, to the downlink Doppler frequency. In such examples, the base station may transmit repetitions of a downlink reference signal for measurement by a UE. For instance, the base station may transmit repetitions (e.g., two repetitions, four repetitions) of a tracking reference signal that are measured by the UE. The UE may determine the downlink Doppler frequency based on measuring the tracking reference signals and report the downlink Doppler frequency to the base station. Because the base station has determined reciprocity exists for the uplink and downlink channels, at least with respect to Doppler frequency, the base station may determine the uplink Doppler frequency based on the downlink Doppler frequency (e.g., the base station may determine that the uplink Doppler frequency is equal to the downlink Doppler frequency). Although described with reference to a tracking reference signal, the reciprocity techniques described herein can be implemented using other suitable downlink reference signals (e.g., DMRS).

Thus, a base station may estimate the Doppler frequency for an uplink channel by 1) measuring repetitions of uplink SRS or 2) using the Doppler frequency estimation obtained from the downlink channel.

FIG. 6 illustrates a process flow 600 that supports demodulation reference signal configuration selection in accordance with various aspects of the present disclosure. Process flow 600 may be performed by base station 605 and UE 615, which may be examples of a base station and UE described herein.

Process flow 600 illustrates an exemplary collection of operations performed to support the estimation of uplink Doppler frequency. For example, process flow 600 depicts internal signaling that may be exchanged and internal processing that may be performed to support estimating an uplink Doppler frequency. Process flow 600 may be related to a process for using reference signals to determine channel characteristics that may be in turn be used to determine preferred reception parameters, such as a preferred DMRS configuration, precoding matrix, rank, and MCS.

One skilled in the art would understand that one or more of the operations described in process flow 600 may be performed earlier or later in the process, omitted, replaced, supplemented, or any combination thereof. Also, additional operations described herein that are not included in process flow 600 may be included.

At block 620, base station 605 may determine the subcarrier spacing and carrier frequency used by UE 615 for communications with base station 605. In some examples, base station 605 may also determine other characteristics, metrics, parameters, or factors, such as UE type, UE capability, UE mobility status, and cell type (e.g., the type of the cell associated with base station 605).

At block 625, base station 605 may select an SRS configuration for use by UE 615. The SRS configuration may be selected based on the subcarrier spacing and carrier frequency used by UE 615 to communicate with base station 605. In some examples, the SRS configuration may be selected based on additional characteristics, metrics, parameters, or factors, such as UE type, UE capability, UE mobility status, and cell type.

At arrow 630, base station 605 may transmit an indication of the SRS configuration to UE 615. In some examples, base station 605 may also transmit an indication of when UE 615 should transmit the SRS. For example, base station 605 may indicate whether the SRS repetitions are to be transmitted periodically (e.g., in periodically scheduled resources), aperiodically (e.g., in resources dynamically scheduled by DCI), or semi-persistently (e.g., in RRC-configured resources activated by a medium access control (MAC) control element (MAC-CE)).

At block 635, UE 615 may determine the SRS configuration based on the indication of the SRS configuration received at arrow 630. At arrow 640, UE 615 may transmit repetitions of the SRS to base station 605 in accordance with the SRS configuration. In one example, UE 615 may transmit a set of SRS repetitions in the same subframe. For instance, UE 615 may transmit a first repetition of the SRS in a first symbol location of a subframe and transmit a second repetition of the SRS in second symbol location of the subframe (e.g., as illustrated in SRS configuration 500-$a$). In another example, UE 615 may transmit a set of SRS repetitions in different subframes. For instance, UE 615 may transmit a first repetition of the SRS in a first symbol location of a first subframe and transmit a second repetition of the SRS in second symbol location of the subframe (e.g., as illustrated in SRS configuration 500-$b$). In some examples, the first and second subframes are consecutive subframes. UE 615 may transmit the SRS repetitions (or bursts of SRS repetitions) periodically, aperiodically, or semi-persistently, as indicated by base station 605.

The SRS repetitions may be transmitted using a single port (e.g., antenna port, SRS port) or multiple ports (e.g., multiple antenna ports, multiple SRS ports). When multiple ports are used, the ports may be quasi-collocated to facilitate Doppler frequency estimation. In the case of beam-based transmission, the SRS repetitions may be transmitted using the same transmission beam and the same antenna panel. In some example, the SRS repetitions may be transmitted over the entire bandwidth part assigned to UE 615. Alternatively, the SRS repetitions may be transmitted over a portion of the bandwidth part assigned to UE 615.

At block 645, base station 605 may measure the SRS repetitions received at arrow 640. In one example, base station 605 may measure a set (e.g., pair) of SRS repetitions that are received in the same subframe. For instance, base station 605 may measure a first repetition of the SRS received in a first symbol of a subframe and measure a second repetition of the SRS received in second symbol of the subframe (e.g., as illustrated in SRS configuration 500-$a$). In another example, base station 605 may measure a set of SRS repetitions that are received in different subframes. For instance, base station 605 may measure a first repetition of the SRS received in a first symbol of a first subframe and measure a second repetition of the SRS received in second symbol of the subframe (e.g., as illustrated in SRS configuration 500-$b$). In some examples, the first and second subframes are consecutive subframes.

At block 650, base station 605 may determine the correlation in time between the SRS repetitions based on the measurements performed at block 645. At block 655, base station 605 may estimate a Doppler frequency for the uplink channel between base station 605 and UE 615. The Doppler frequency may be estimated based on the correlation determined at block 650, and thus may be based on the measurements of the SRS repetitions performed at block 645. In some examples, base station 605 may also determine other characteristics, conditions, parameters, or metrics, such as delay spread ($\tau_{rms}$) for the uplink channel, the temporal spacing between resource elements used for an uplink reference signal ($D_t$) (which may be equal to the repetition spacing when the uplink reference signal is the SRS), the frequency spacing between resource elements used for the uplink reference signal ($D_f$), the power level used to transmit the uplink reference signal relative to a power level used to transmit data ($\rho_p$), and/or a link quality characteristics (e.g., reception SNR and post-processing SINR) for the uplink channel.

At block 660, base station 605 may determine the uplink DMRS configuration based on the Doppler frequency, among other factors (e.g., one or more factors determined at block 645). The uplink DMRS configuration may be determined as described with reference to FIGS. 1 through 3. At arrow 665, base station 605 may transmit an indication of the uplink DMRS configuration to UE 615. At arrow 670, UE 615 may transmit DMRS to base station 605 according to the DMRS configuration indicated at arrow 665. Thus, a base station 605 may implement an appropriate DMRS—that allows for the spectral efficiency of a link to be increased—by determining uplink Doppler frequency that is based on an SRS with repetition spacing tailored to communication parameters (e.g., subcarrier spacing and carrier frequency) of UE 615. If the communication parameters of UE 615 change, base station 605 may perform the operations between block 620 and block 655 again to determine an updated SRS configuration for estimating the uplink Doppler frequency.

FIG. 7 illustrates a process flow 700 that supports demodulation reference signal configuration selection in accordance with various aspects of the present disclosure. Process flow 700 may be performed by base station 705 and UE 715, which may be examples of a base station and UE described herein.

Process flow 700 illustrates an exemplary collection of operations performed to support the estimation of uplink Doppler frequency. For example, process flow 700 depicts internal signaling that may be exchanged and internal processing that may be performed to support estimating an uplink Doppler frequency. Process flow 700 may be related to a process for using reference signals to determine channel characteristics that may be in turn be used to determine preferred transmission parameters, such as a preferred DMRS configuration, precoding matrix, rank, and MCS.

One skilled in the art would understand that one or more of the operations described in process flow 700 may be performed earlier or later in the process, omitted, replaced, supplemented, or any combination thereof. Also, additional operations described herein that are not included in process flow 700 may be included.

At arrow 720, base station 705 may transmit a tracking reference signal to UE 715. For example, base station 705 may transmit repetitions of the tracking reference signal to UE 715. In one example, base station 705 may transmit multiple (e.g., two) repetitions of the tracking reference signal in the same subframe. For instance, base station 705 may transmit a first repetition of the tracking reference signal in a first symbol location of a subframe and transmit a second repetition of the tracking reference signal in a second symbol location of the subframe. In another example, base station 705 may transmit multiple (e.g., four) repetitions of the tracking reference signal in different subframes. For instance, base station 705 may transmit two repetitions of the tracking reference signal in two symbols of a first subframe and two repetitions of the tracking reference signal in two symbols of a second subframe. The first and second subframes may be consecutive subframes.

In some examples, base station 705 may also transmit control signaling that indicates when UE 715 is to report a downlink Doppler frequency. For example, the base station 705 may indicate that the UE is to report the downlink Doppler frequency periodically, aperiodically, or semi-persistently. Periodic reporting may be configured via RRC signaling. Aperiodic reporting may be scheduled via DCI signaling. Semi-persistent reporting may be configured via RRC signaling and activated/deactivated using MAC-CE signaling.

At block 725, UE 715 may measure the tracking reference signal received from base station 705. In one example, UE 715 may measure multiple (e.g., two) repetitions of the tracking reference signal received in the same subframe. For instance, UE 715 may measure a first repetition of the tracking reference signal received in a first symbol location of a subframe and measure a second repetition of the tracking reference signal received in a second symbol location of the subframe. In another example, UE 715 may measure multiple (e.g., two, four) repetitions of the tracking reference signal received in different subframes. For instance, UE 715 may measure two repetitions of the tracking reference signal received in two symbols of a first subframe and/or measure two repetitions of the tracking reference signal received in two symbols of a second subframe. The first and second subframes may be consecutive subframes.

In some examples, UE 715 may, at arrow 730, transmit an uplink reference signal to base station 705. The uplink reference signal may be a DMRS or SRS. In some examples, the base station 705 may, at block 735, determine a link quality characteristic (e.g., post-processing SINR, reception SNR) based on the uplink reference signal received from UE 715. The link quality characteristic may be used by base station 705 to determine a DMRS configuration at arrow 785.

At block 740, UE 715 may determine a correlation in time between the repetitions of the tracking reference signal received at arrow 720. The correlation may be determined based on the measurements of the tracking reference signals performed at block 725. At block 745, UE 715 may estimate a Doppler frequency for the downlink channel between base station 705 and UE 715. The Doppler frequency may be estimated based on the correlation determined at block 740, and thus may be based on the measurements of the tracking reference signal performed at block 725.

In some examples, UE 715 may, at block 750, estimate a delay spread for the downlink channel. The delay spread may be estimated based on the measurements of the tracking reference signal performed at block 725, among other factors.

At arrow 755, UE 715 may report the downlink Doppler frequency to base station 705 by sending an indication of the downlink Doppler frequency to base station 705. The indication of the downlink Doppler frequency may be included in a field of a CSI report (e.g., a CSF report). Alternatively, the downlink Doppler frequency may be included in a report dedicated to the downlink Doppler frequency. The downlink Doppler frequency may be reported periodically, aperiodically, or semi-persistently, as indicated by base station 705. In some examples, the downlink Doppler frequency report may include an indication of quasi-collocation information, a transmission configuration indicator (TCI), or a tracking reference signal identifier associated with the tracking reference signal. Base station 705 may evaluate the downlink Doppler frequency report on the beam used to serve UE 715. Additionally, or alternatively, a UE may evaluate the downlink Doppler frequency report based on the transmission configuration indicator or tracking reference signal identifier indicated to a UE 715.

In some examples, UE 715 may also, at arrow 760, report the delay spread to base station 705 by sending an indication of the delay spread to base station 705. The delay spread may be included in the same report as the downlink Doppler frequency (e.g., in an optional field) or a different report.

At block 765, base station 705 may determine that there is a reciprocity between the uplink channel and the downlink channel, at least for Doppler frequency (and possibly, but not necessarily, for other metrics). For example, base station 705 may assume that the uplink Doppler frequency is equal to the downlink Doppler frequency when one or more conditions of reciprocity are satisfied. One example of a reciprocity condition is the use of uplink resources and downlink resources that are in the same frequency band. Another example of a reciprocity condition is the use of time division duplexing (TDD) to schedule uplink and downlink communications. Another example of a reciprocity condition is the use of the same antenna panels and the same serving beam (e.g., transmit and receive pair) for uplink and downlink. Another example of a reciprocity condition is beam correspondence in the uplink from the perspective of UE 715 and base station 705. Another example of a reciprocity condition is the use of the same or similar precoding for uplink and downlink (at least in the digital beam direction). Another example of a reciprocity condition is use of the same quantity of receive antennas in in the downlink as transmit antennas in the uplink.

At block 770, base station 705 may determine the Doppler frequency for the uplink channel between base station 705 and UE 715. The uplink Doppler frequency may be determined based on the downlink Doppler frequency. For example, base station 705 may determine that the uplink Doppler frequency is equal to the downlink Doppler frequency. The base station may determine the uplink Doppler frequency based on there being reciprocity between the uplink Doppler frequency and the downlink Doppler frequency (as determined at block 765). Another example of a reciprocity condition is addressing the same TRP as a destination of UL transmission as the TRP transmitting DL TRS being used a source for Doppler estimation in DL.

In some examples, base station 705 may, at block 775, determine the delay spread for the uplink channel. The delay spread may be determined based on measurements of an SRS received from UE 715 or based on an indication of the downlink delay spread received at block 770. For example, base station 705 may determine that the uplink delay spread is equal to the downlink delay spread when there is reciprocity between the uplink and downlink channels (as opposed to reciprocity between Doppler frequencies). In some examples, base station 705 may also determine other characteristics, conditions, parameters, or metrics, such as delay spread ($\tau_{rms}$) for the uplink channel, the temporal spacing between resource elements used for an uplink reference signal ($D_t$), the frequency spacing between resource elements used for the uplink reference signal ($D_f$), the power level used to transmit the uplink reference signal relative to a power level used to transmit data ($\rho_p$), and/or a link quality characteristic (e.g., reception SNR, post-processing SINR) for the uplink channel.

At block 780, base station 705 may determine the uplink DMRS configuration based on the Doppler frequency, among other factors (e.g., one or more factors determined at block 775). The uplink DMRS configuration may be determined as described with reference to FIGS. 1 through 3. At arrow 785, base station 705 may transmit an indication of the uplink DMRS configuration to UE 715. At arrow 790, UE 715 may transmit DMRS to base station 705 according to the DMRS configuration indicated at arrow 785. Thus, base station 705 may implement an appropriate uplink DMRS—that allows for the spectral efficiency of a link to be increased—by determining an uplink Doppler frequency that is based on measurement of a tracking reference signal by UE 715.

Although described with reference to a tracking reference signal, the reciprocity techniques described herein can be implemented using other suitable downlink reference signals (e.g., downlink demodulation reference signals). However, use of a tracking reference signal may provide a more accurate Doppler frequency estimation than use of demodulation reference signals because the repetition spacing between tracking reference signals may be more consistent and more appropriate than the repetition spacing between demodulation reference signals (e.g., due to variability in PUSCH scheduling).

Figure 8:
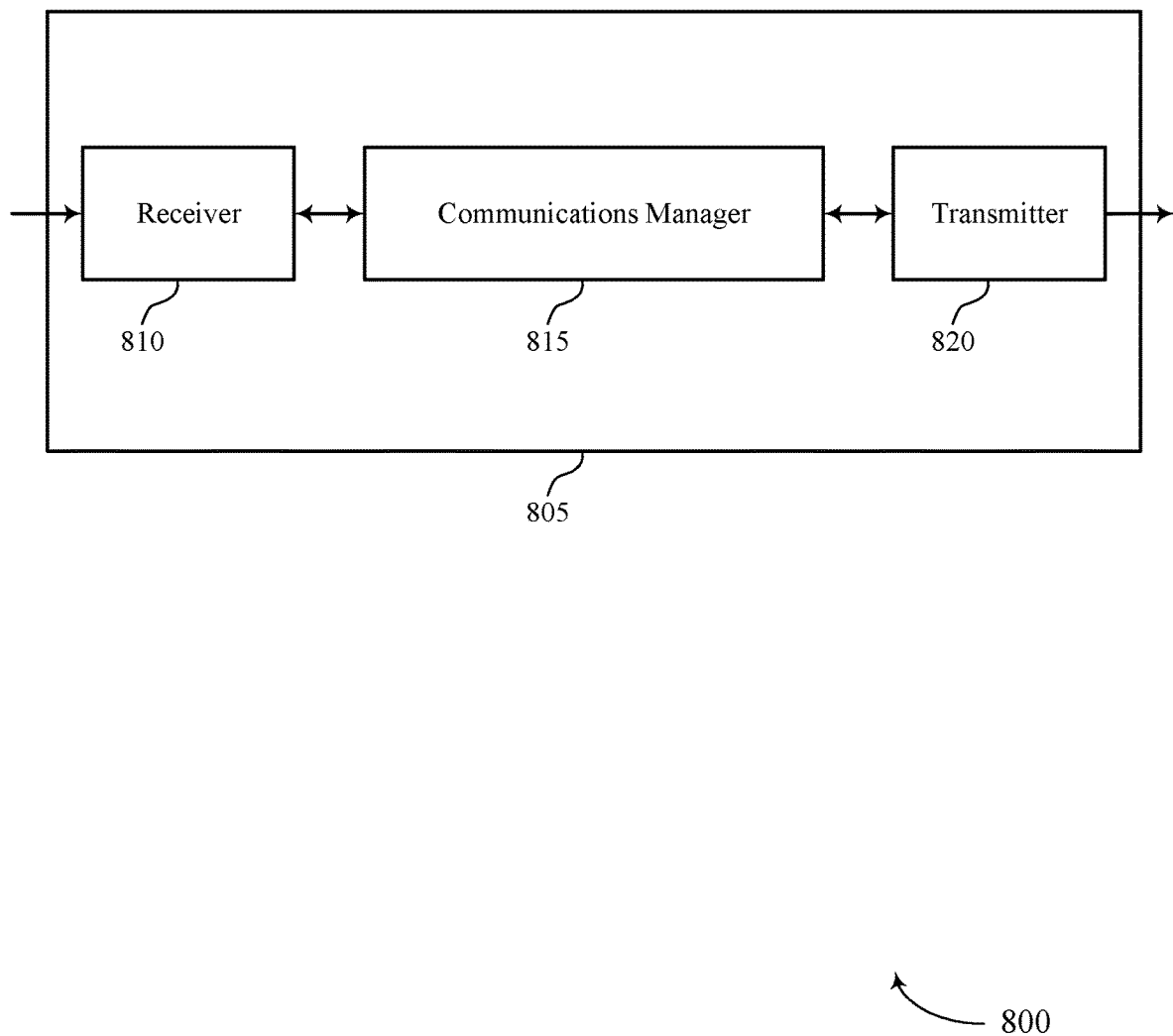
FIGS. 8 and 9 show block diagrams of devices that support demodulation reference signal configuration selection in accordance with aspects of the present disclosure.

FIG. 8 shows a block diagram 800 of a device 805 that supports demodulation reference signal configuration selection in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to uplink Doppler metric estimation based on an uplink reference signal, etc.). Information may be passed on to other components of the device 805. The receiver 810 may be an example of aspects of the transceiver 1120 described with reference to FIG. 11. The receiver 810 may utilize a single antenna or a set of antennas. A Doppler metric may refer to any metric associated with the Doppler effect, including Doppler frequency, Doppler shift, max Doppler shift, and Doppler spread, among others.

The communications manager 815 may receive an indication of a configuration for a sounding reference signal, the configuration defining a temporal spacing between symbols reserved for repetitions of the sounding reference signal. The communications manager 815 may also transmit repetitions of the sounding reference signal in the symbols according to the configuration for the sounding reference signal. The communications manager 815 may also receive an indication of a configuration for a demodulation reference signal based on transmitting the repetitions of the sounding reference signal. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
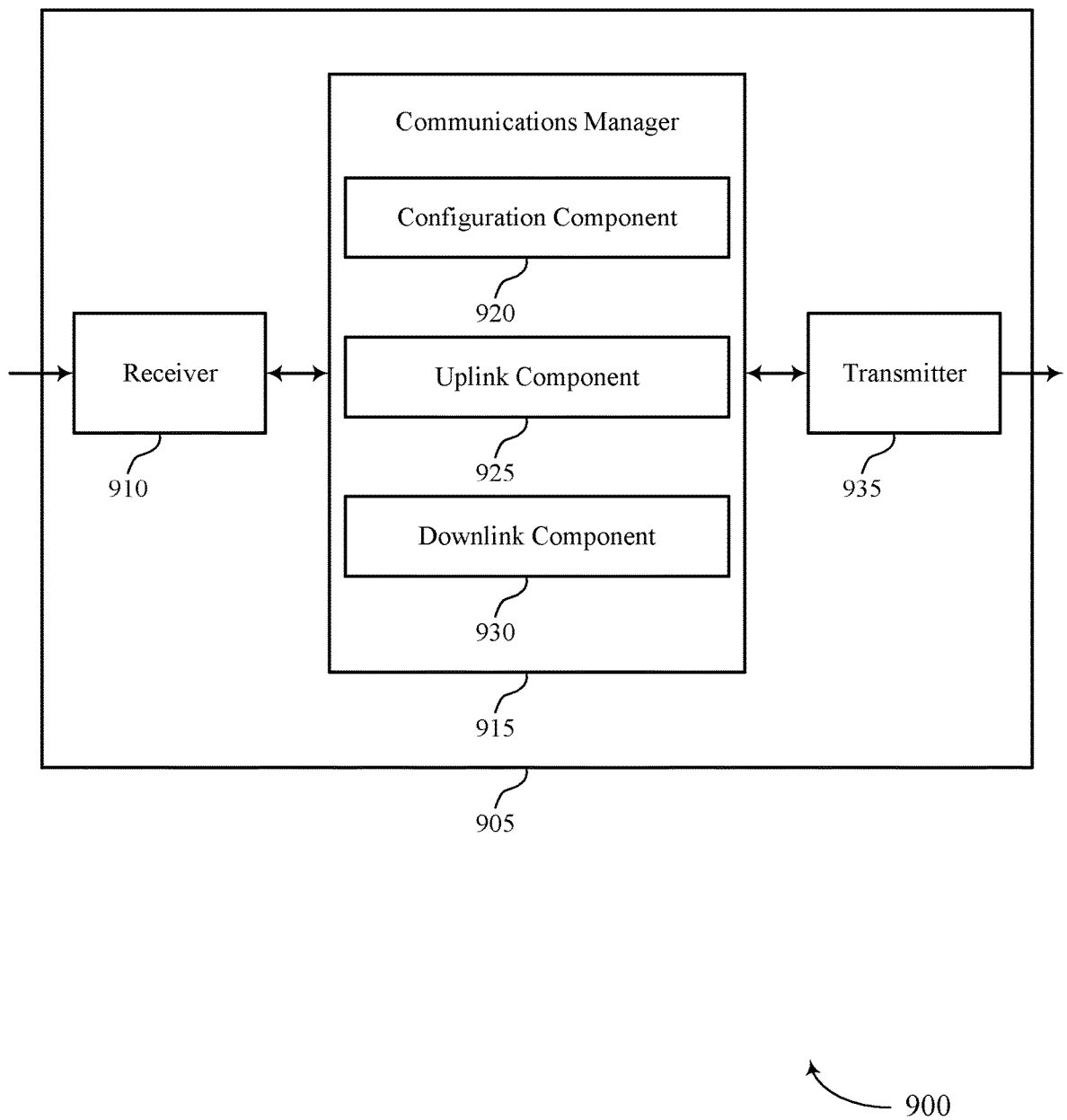

FIG. 9 shows a block diagram 900 of a device 905 that supports demodulation reference signal configuration selection in accordance with aspects of the present disclosure. The device 905 may be an example of aspects of a device 805, or a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to uplink Doppler metric estimation based on an uplink reference signal, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a configuration component 920, an uplink component 925, and a downlink component 930. The communications manager 915 may be an example of aspects of the communications manager 1110 described herein.

The configuration component 920 may receive an indication of a configuration for a sounding reference signal, the configuration defining a temporal spacing between symbols reserved for repetitions of the sounding reference signal. The uplink component 925 may transmit repetitions of the sounding reference signal in the symbols according to the configuration for the sounding reference signal. The downlink component 930 may receive an indication of a configuration for a demodulation reference signal based on transmitting the repetitions of the sounding reference signal.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
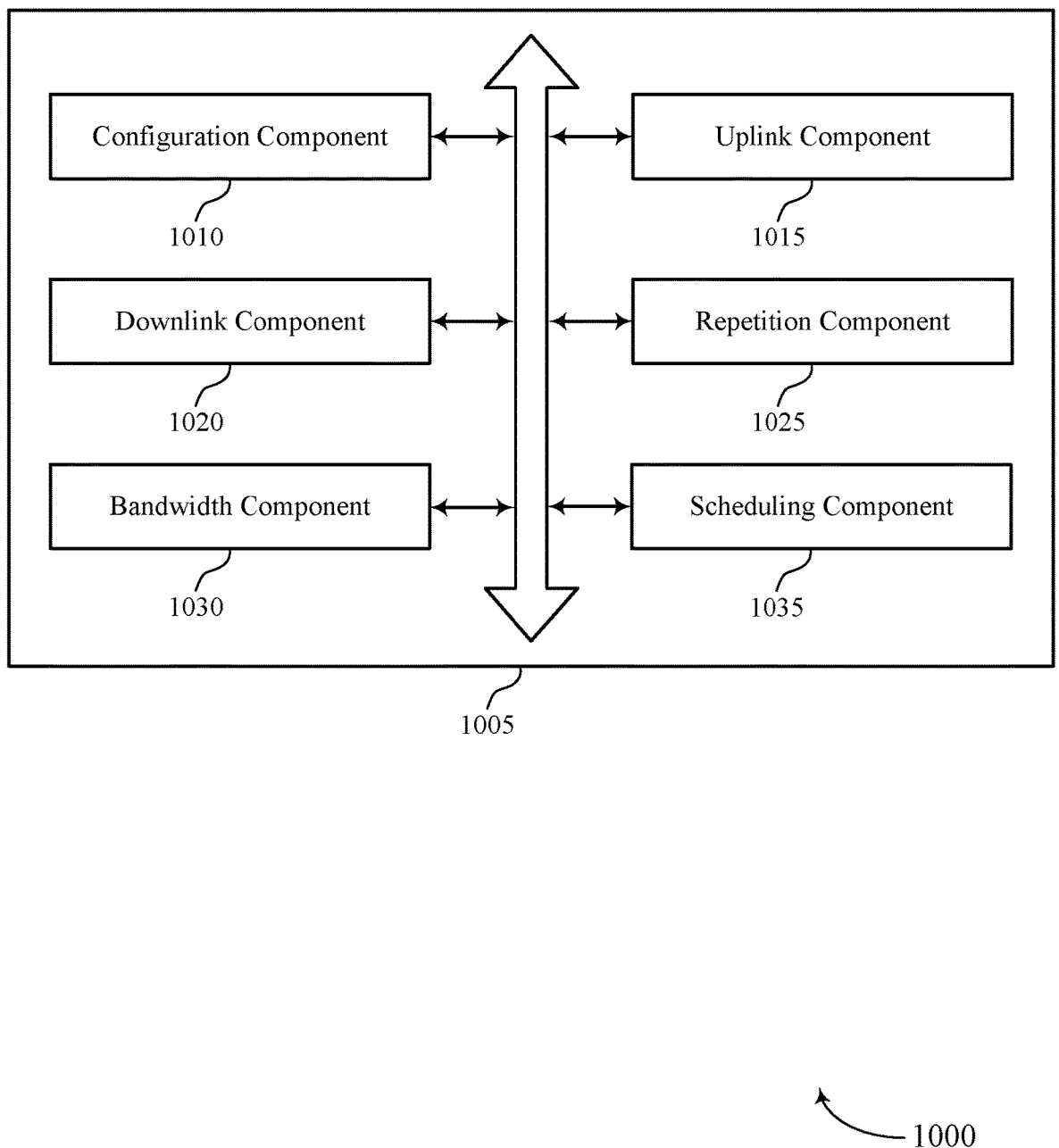
FIG. 10 shows a block diagram of a communications manager that supports demodulation reference signal configuration selection in accordance with aspects of the present disclosure.

FIG. 10 shows a block diagram 1000 of a communications manager 1005 that supports demodulation reference signal configuration selection in accordance with aspects of the present disclosure. The communications manager 1005 may be an example of aspects of a communications manager 815, a communications manager 915, or a communications manager 1110 described herein. The communications manager 1005 may include a configuration component 1010, an uplink component 1015, a downlink component 1020, a repetition component 1025, a port component 1030, and a bandwidth component 1035. Each of these modules may communicate, directly or indirectly, with one another (e.g., via one or more buses).

The configuration component 1010 may receive an indication of a configuration for a sounding reference signal, the configuration defining a temporal spacing between symbols reserved for repetitions of the sounding reference signal. In some cases, the configuration for the sounding reference signal is based on a carrier frequency and a subcarrier spacing used for communicating with a base station. In some cases, the configuration for the demodulation reference signal is based on an uplink Doppler metric measured from the repetitions of the sounding reference signal.

The uplink component 1015 may transmit repetitions of the sounding reference signal in the symbols according to the configuration for the sounding reference signal. The downlink component 1020 may receive an indication of a configuration for a demodulation reference signal based on transmitting the repetitions of the sounding reference signal.

The repetition component 1025 may transmit a first repetition of the sounding reference signal in a first symbol of a subframe. In some examples, the repetition component 1025 may transmit a second repetition of the sounding reference signal in a second symbol of the subframe, where the first and second symbols are separated by multiple symbols.

In some examples, the repetition component 1025 may transmit a first repetition of the sounding reference signal in a first symbol of a first subframe. In some examples, the repetition component 1025 may transmit a second repetition of the sounding reference signal in a second symbol of a second subframe, where the first and second subframes are consecutive.

In some examples, the repetition component 1025 may use a same antenna port for the repetitions of the sounding reference signal. In some examples, the repetition component 1025 may use at same set of antenna ports for the repetitions of the sounding reference signal. In some examples, the repetition component 1025 may use sounding reference signal ports that are quasi-collocated for the repetitions of the sounding reference signal. In some examples, the repetition component 1025 may use a same transmission beam and the same antenna panel for the repetitions of the sounding reference signal.

The bandwidth component 1030 may transmit the repetitions of the sounding reference signal over a same portion of a bandwidth part configured for the UE. In some examples, the scheduling component 1035 may receive an indication that the repetitions of the sounding reference signal are to be transmitted periodically, aperiodically, or semi-persistently.

Figure 11:
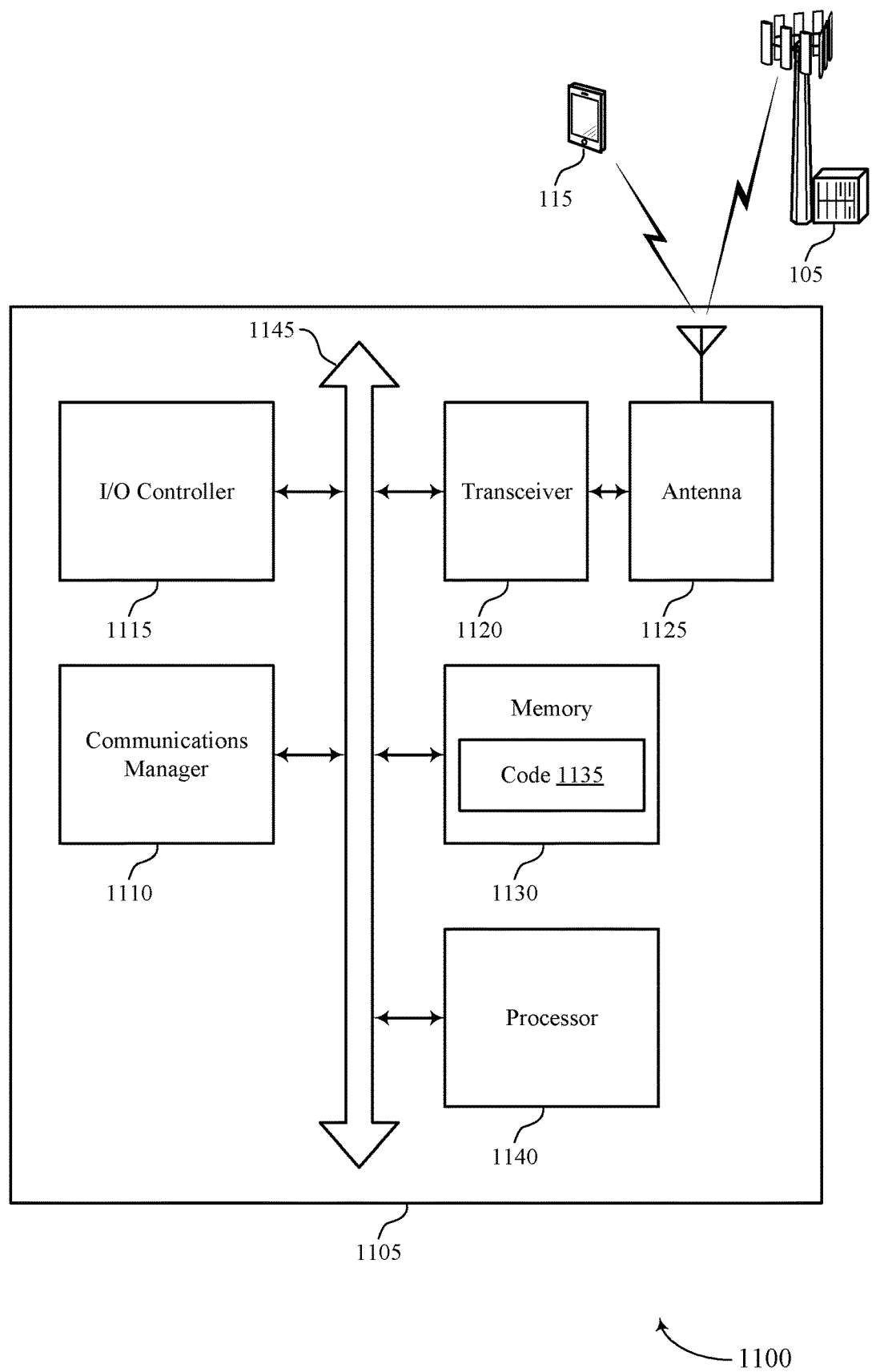
FIG. 11 shows a diagram of a system including a device that supports demodulation reference signal configuration selection in accordance with aspects of the present disclosure.

FIG. 11 shows a diagram of a system 1100 including a device 1105 that supports demodulation reference signal configuration selection in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive an indication of a configuration for a sounding reference signal, the configuration defining a temporal spacing between symbols reserved for repetitions of the sounding reference signal, transmit repetitions of the sounding reference signal in the symbols according to the configuration for the sounding reference signal, and receive an indication of a configuration for a demodulation reference signal based on transmitting the repetitions of the sounding reference signal.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting uplink Doppler metric estimation based on an uplink reference signal).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
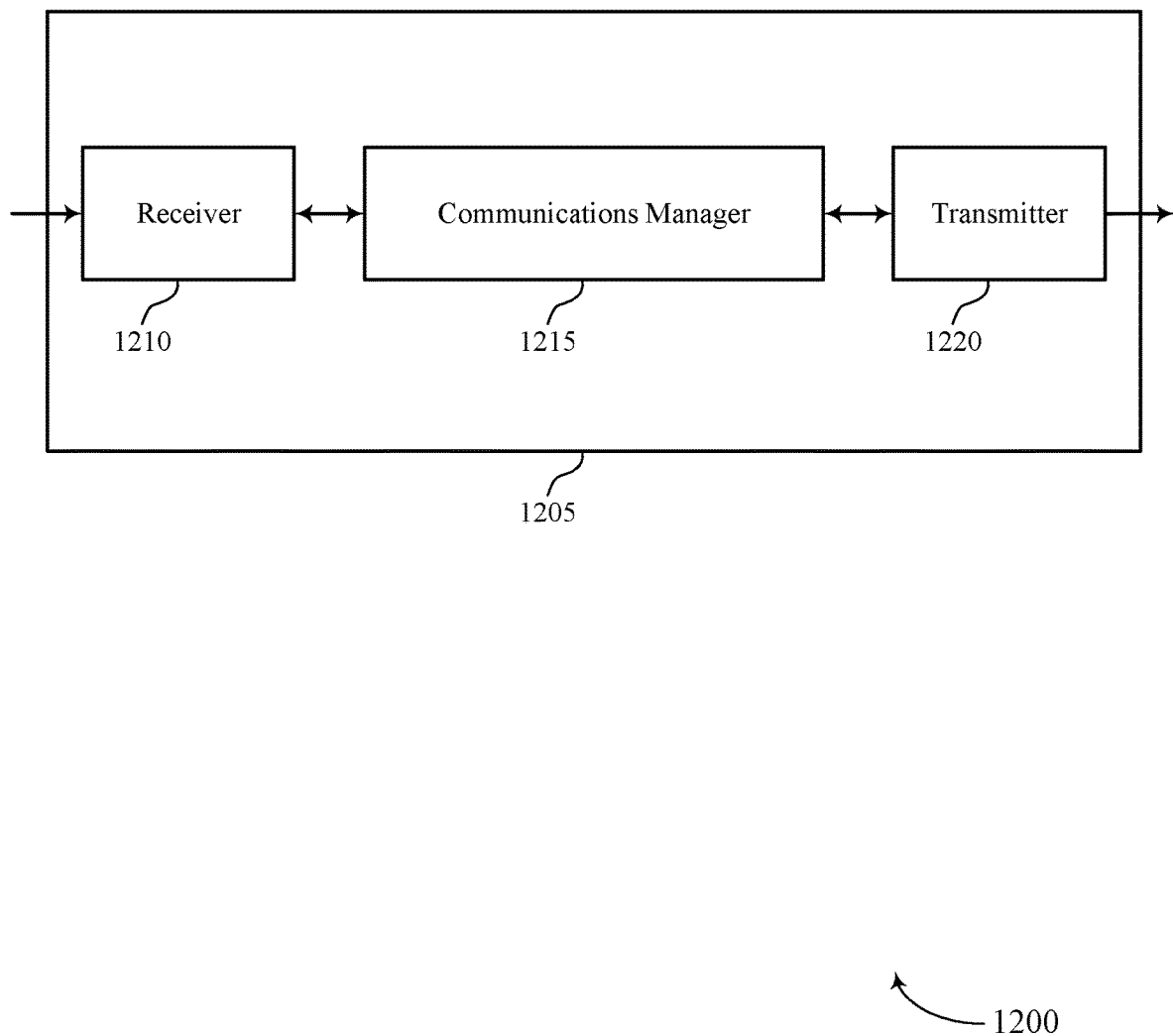
FIGS. 12 and 13 show block diagrams of devices that support demodulation reference signal configuration selection in accordance with aspects of the present disclosure.

FIG. 12 shows a block diagram 1200 of a device 1205 that supports demodulation reference signal configuration selection in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to uplink Doppler metric estimation based on an uplink reference signal, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may select a configuration for a sounding reference signal based on a subcarrier spacing and a carrier frequency, the configuration defining a temporal spacing between symbols reserved for repetitions of the sounding reference signal. The communications manager 1215 may also transmit an indication of the configuration for the sounding reference signal to a UE, transmit an indication of a configuration for an uplink demodulation reference signal that is based on the Doppler metric for the uplink channel. The communications manager 1215 may also determine, for an uplink channel between the base station and the UE, a Doppler metric based on measuring repetitions of the sounding reference signal transmitted by the UE. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
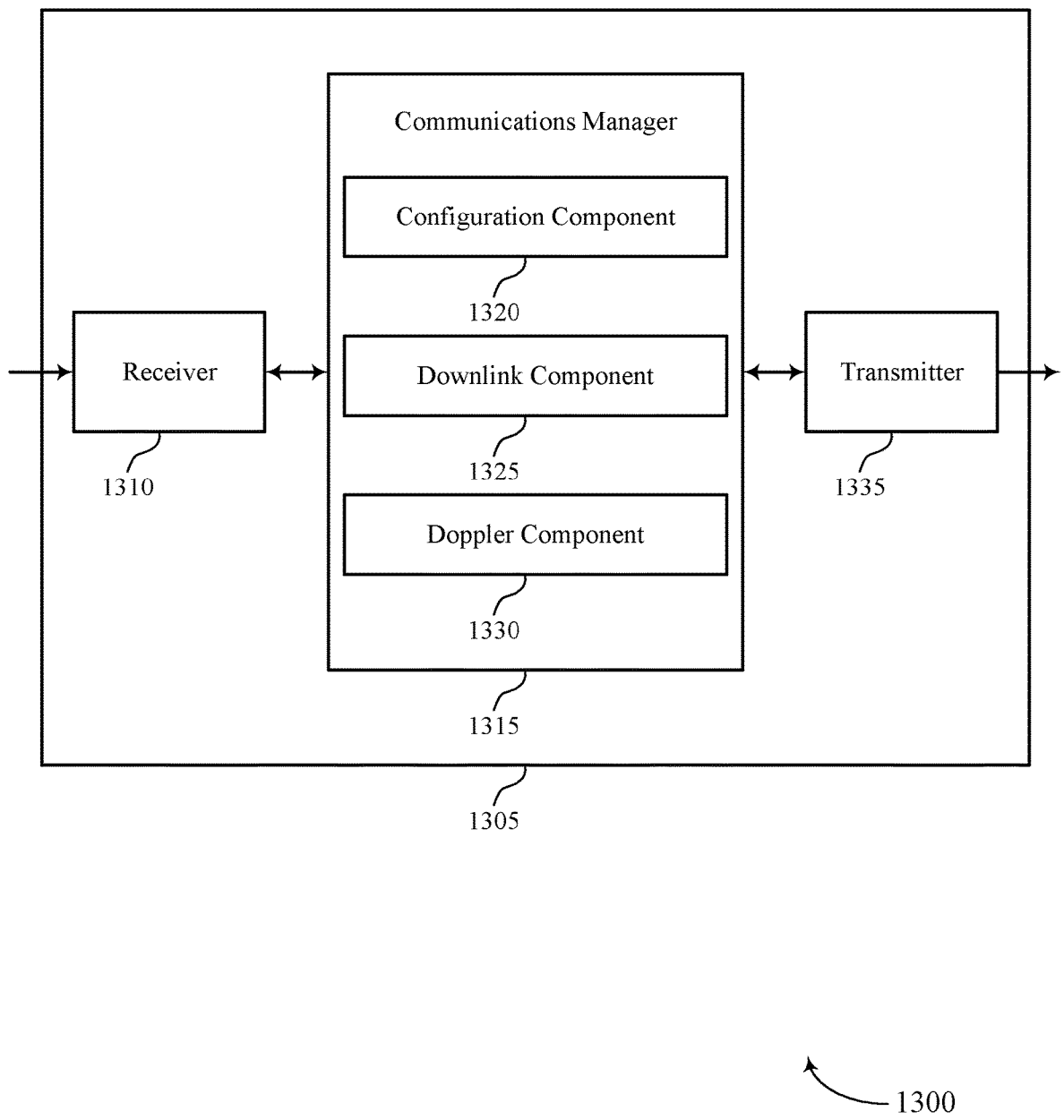

FIG. 13 shows a block diagram 1300 of a device 1305 that supports demodulation reference signal configuration selection in accordance with aspects of the present disclosure. The device 1305 may be an example of aspects of a device 1205, or a base station 105 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to uplink Doppler metric estimation based on an uplink reference signal, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a configuration component 1320, a downlink component 1325, and a Doppler component 1330. The communications manager 1315 may be an example of aspects of the communications manager 1510 described herein.

The configuration component 1320 may select a configuration for a sounding reference signal based on a subcarrier spacing and a carrier frequency, the configuration defining a temporal spacing between symbols reserved for repetitions of the sounding reference signal. The downlink component 1325 may transmit an indication of the configuration for the sounding reference signal to a UE and transmit an indication of a configuration for an uplink demodulation reference signal that is based on the Doppler metric for the uplink channel. The Doppler component 1330 may determine, for an uplink channel between the base station and the UE, a Doppler metric based on measuring repetitions of the sounding reference signal transmitted by the UE.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
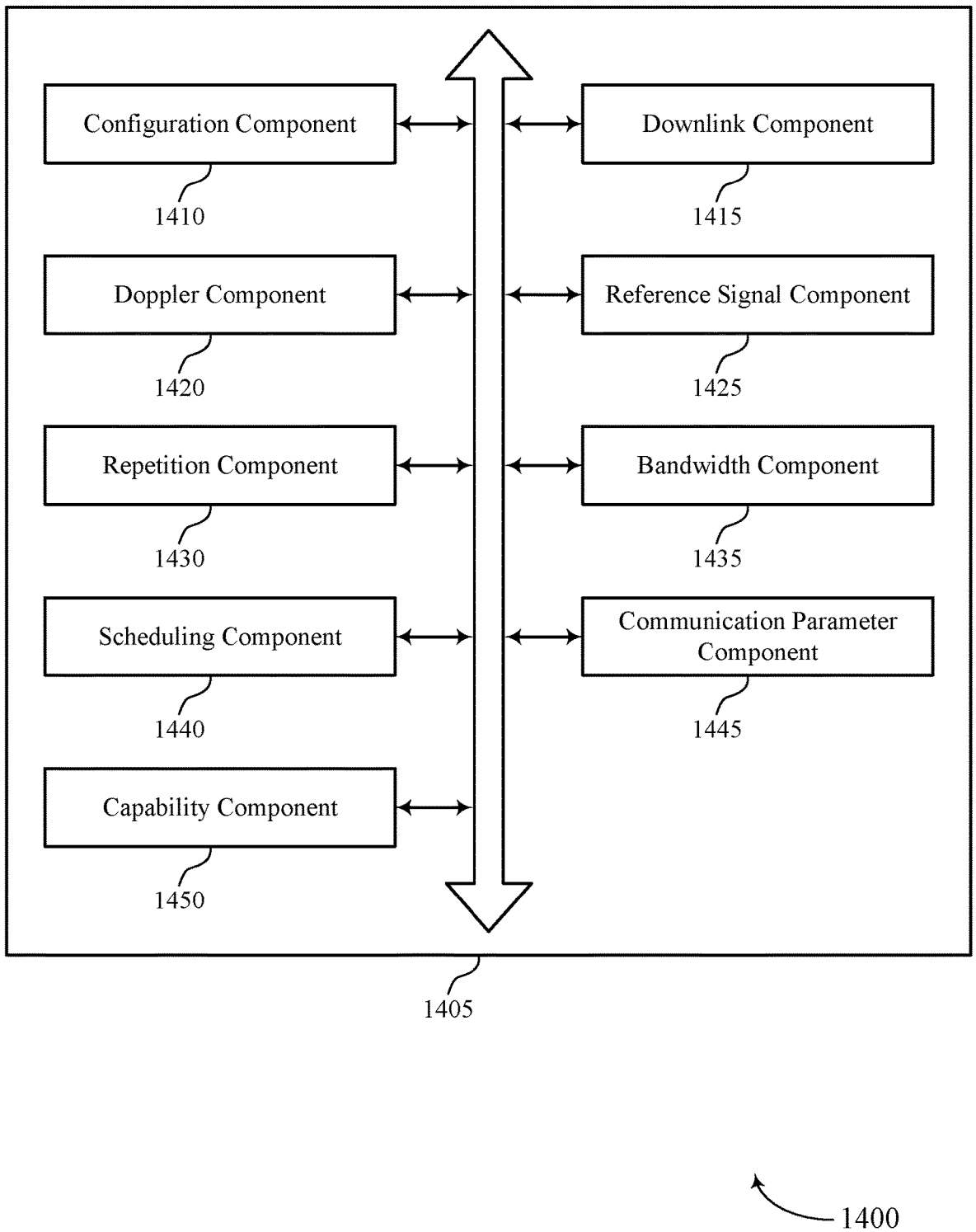
FIG. 14 shows a block diagram of a communications manager that supports demodulation reference signal configuration selection in accordance with aspects of the present disclosure.

FIG. 14 shows a block diagram 1400 of a communications manager 1405 that supports demodulation reference signal configuration selection in accordance with aspects of the present disclosure. The communications manager 1405 may be an example of aspects of a communications manager 1215, a communications manager 1315, or a communications manager 1510 described herein. The communications manager 1405 may include a configuration component 1410, a downlink component 1415, a Doppler component 1420, a reference signal component 1425, a repetition component 1430, a bandwidth component 1435, a scheduling component 1440, a communication parameter component 1445, and a capability component 1450. Each of these modules may communicate, directly or indirectly, with one another (e.g., via one or more buses).

The configuration component 1410 may select a configuration for a sounding reference signal based on a subcarrier spacing and a carrier frequency, the configuration defining a temporal spacing between symbols reserved for repetitions of the sounding reference signal. In some cases, the temporal spacing is between symbols in a same uplink subframe. In some cases, the temporal spacing is between symbols in two consecutive uplink subframes. The downlink component 1415 may transmit an indication of the configuration for the sounding reference signal to a UE. The Doppler component 1420 may determine, for an uplink channel between the base station and the UE, a Doppler metric (e.g., Doppler frequency) based on measuring repetitions of the sounding reference signal transmitted by the UE. The downlink component 1415 may transmit an indication of a configuration for an uplink demodulation reference signal that is based on the Doppler metric for the uplink channel.

The reference signal component 1425 may determine a set of candidate spacing configurations for the sounding reference signal, where each spacing configuration in the set of candidate spacing configurations is associated with at least one combination of a subcarrier spacing and a carrier frequency. In some examples, the reference signal component 1425 may select the spacing configuration from the set of candidate spacing configurations.

The repetition component 1430 may receive a first repetition of the sounding reference signal in a first symbol of a subframe. In some examples, the repetition component 1430 may receive a second repetition of the sounding reference signal in a second symbol of the subframe, where the first and second symbols are separated by multiple symbols.

In some examples, the repetition component 1430 may receive a first repetition of the sounding reference signal in a first symbol of a first subframe. In some examples, the repetition component 1430 may receive a second repetition of the sounding reference signal in a second symbol of a second subframe, where the first and second subframes are consecutive.

The bandwidth component 1435 may receive the repetitions of the sounding reference signal over a same portion of the bandwidth part configured for the UE. In some examples, the bandwidth component 1435 may receive the repetitions of the sounding reference signal over different portions of the bandwidth part configured for the UE.

The scheduling component 1440 may transmit to the UE an indication that the sounding reference signal is to be transmitted periodically, aperiodically, or semi-persistently.

The communication parameter component 1445 may determine a second subcarrier spacing and a second carrier frequency for communicating with a second UE. In some examples, the communication parameter component 1445 may select a second configuration for the sounding reference signal based on the second subcarrier spacing and the second carrier frequency, the second configuration defining a temporal spacing between symbols reserved for repetitions of the sounding reference signal by the second UE.

In some examples, the communication parameter component 1445 may select a second carrier frequency, second subcarrier spacing, or combination thereof, for communicating with the UE. In some examples, the communication parameter component 1445 may select a second configuration of the sounding reference signal based on the second carrier frequency, second subcarrier spacing, or combination thereof, the second configuration defining a second temporal spacing between symbols reserved for repetitions of the sounding reference signal.

The capability component 1450 may determine a capability of the UE, where the configuration for the sounding reference signal and/or the phase coherency between SRS repetitions is based at least in part on the capability of the UE.

Figure 15:
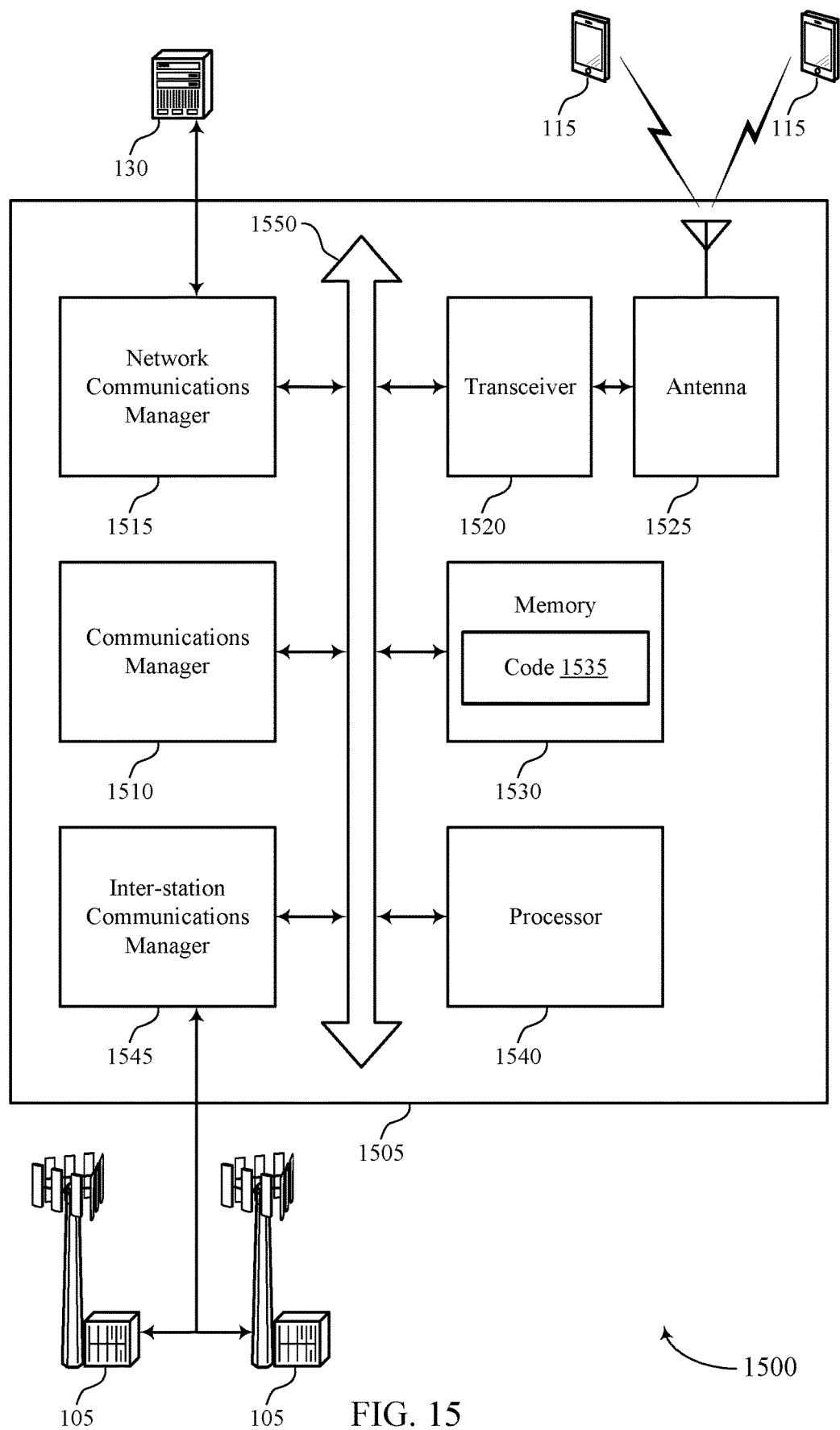
FIG. 15 shows a diagram of a system including a device that supports demodulation reference signal configuration selection in accordance with aspects of the present disclosure.

FIG. 15 shows a diagram of a system 1500 including a device 1505 that supports demodulation reference signal configuration selection in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may select a configuration for a sounding reference signal based on a subcarrier spacing and a carrier frequency, the configuration defining a temporal spacing between symbols reserved for repetitions of the sounding reference signal, transmit an indication of the configuration for the sounding reference signal to a UE, transmit an indication of a configuration for an uplink demodulation reference signal that is based on the Doppler metric for the uplink channel, and determine, for an uplink channel between the base station and the UE, a Doppler metric based on measuring repetitions of the sounding reference signal transmitted by the UE.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting uplink Doppler metric estimation based on an uplink reference signal).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
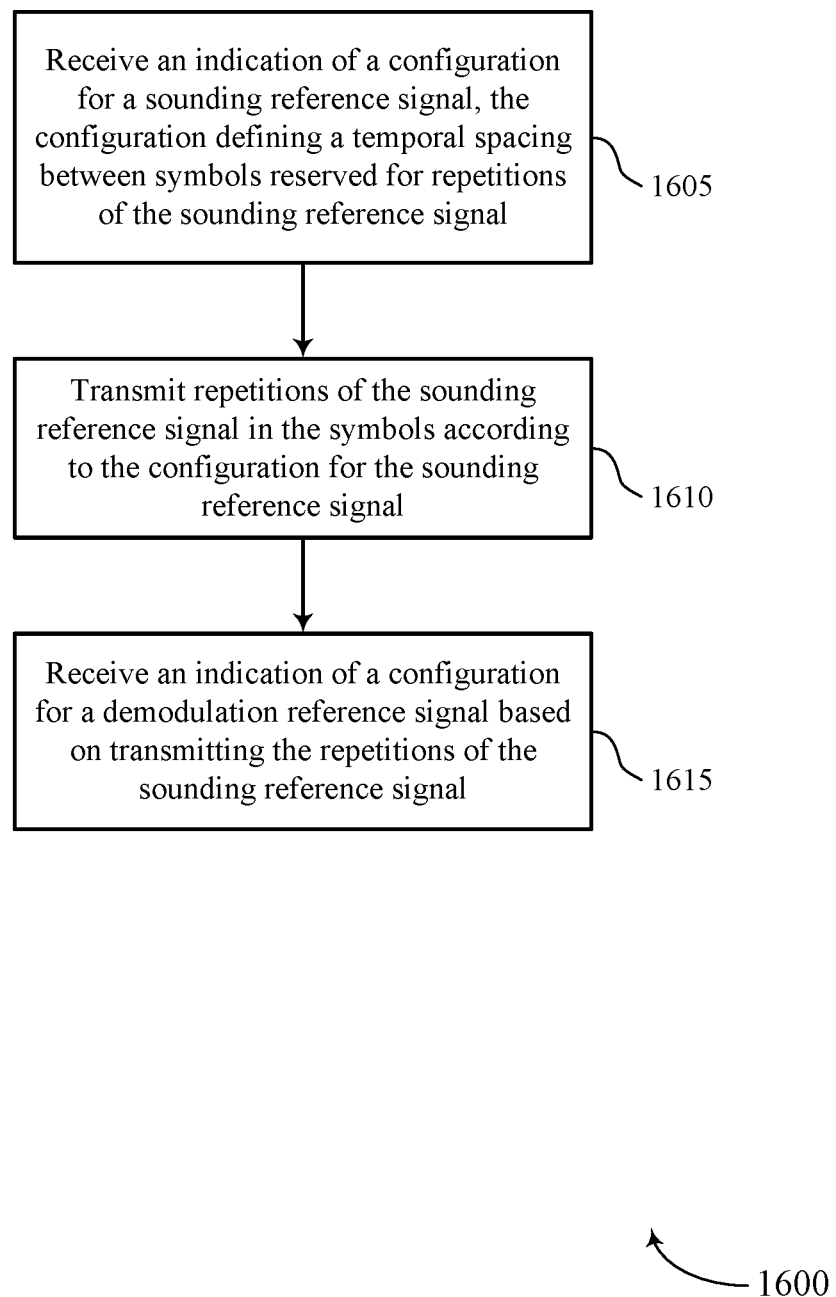
FIGS. 16 and 17 show flowcharts illustrating methods that support demodulation reference signal configuration selection in accordance with aspects of the present disclosure.

FIG. 16 shows a flowchart illustrating a method 1600 that supports demodulation reference signal configuration selection in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may receive an indication of a configuration for a sounding reference signal, the configuration defining a temporal spacing between symbols reserved for repetitions of the sounding reference signal. The operations of 1605 may be performed according to the methods described herein. In some examples, aspects of the operations of 1605 may be performed by a configuration component as described with reference to FIGS. 8 through 11.

At 1610, the UE may transmit repetitions of the sounding reference signal in the symbols according to the configuration for the sounding reference signal. The operations of 1610 may be performed according to the methods described herein. In some examples, aspects of the operations of 1610 may be performed by an uplink component as described with reference to FIGS. 8 through 11.

At 1615, the UE may receive an indication of a configuration for a demodulation reference signal based on transmitting the repetitions of the sounding reference signal. The operations of 1615 may be performed according to the methods described herein. In some examples, aspects of the operations of 1615 may be performed by a downlink component as described with reference to FIGS. 8 through 11.

Figure 17:
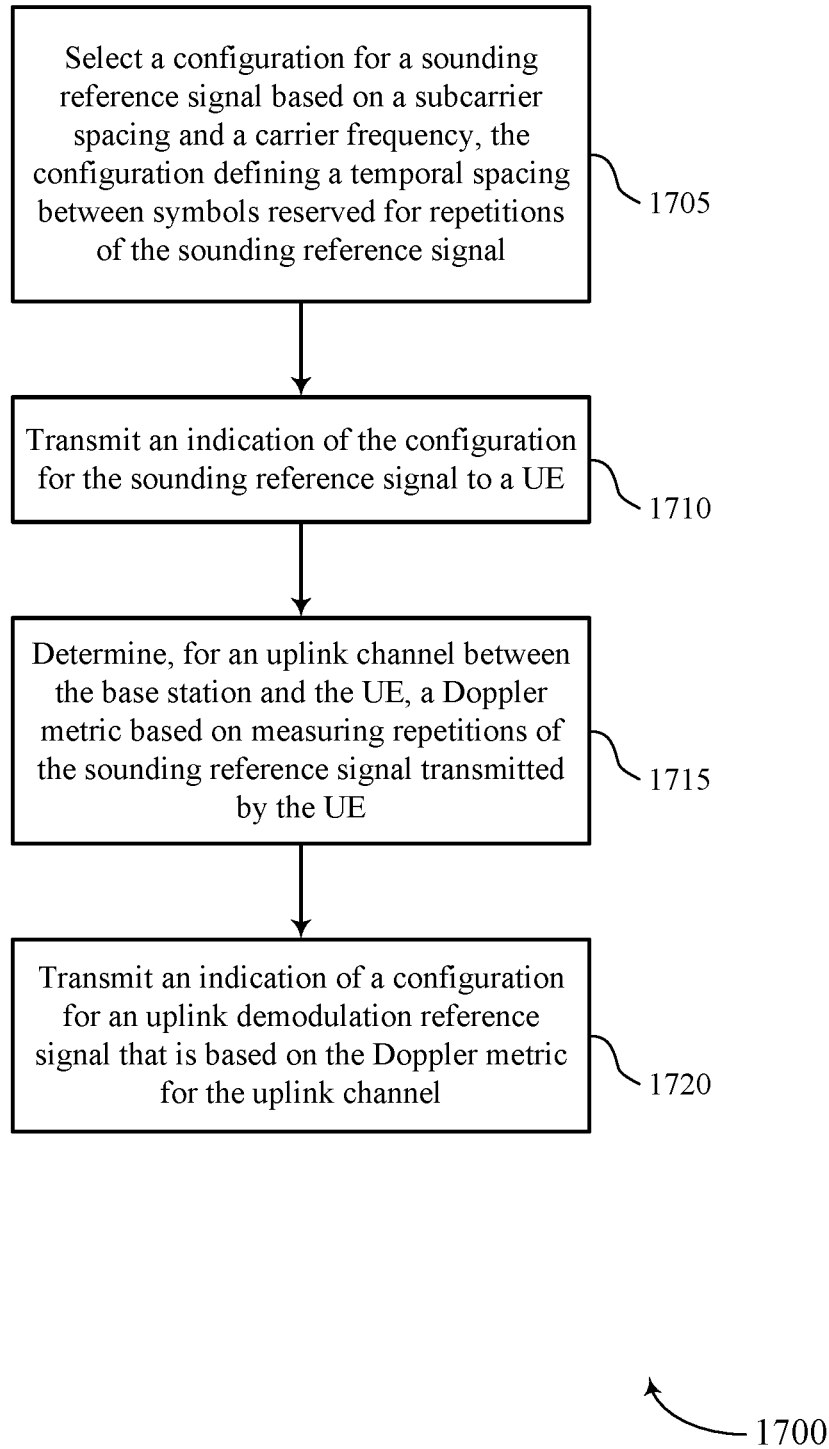

FIG. 17 shows a flowchart illustrating a method 1700 that supports uplink Doppler metric estimation based on an uplink reference signal in accordance with aspects of the present disclosure. The operations of method 1700 may be implemented by a base station 105 or its components as described herein. For example, the operations of method 1700 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1705, the base station may select a configuration for a sounding reference signal based on a subcarrier spacing and a carrier frequency, the configuration defining a temporal spacing between symbols reserved for repetitions of the sounding reference signal. The operations of 1705 may be performed according to the methods described herein. In some examples, aspects of the operations of 1705 may be performed by a configuration component as described with reference to FIGS. 12 through 15.

At 1710, the base station may transmit an indication of the configuration for the sounding reference signal to a UE. The operations of 1710 may be performed according to the methods described herein. In some examples, aspects of the operations of 1710 may be performed by a downlink component as described with reference to FIGS. 12 through 15.

At 1715, the base station may determine, for an uplink channel between the base station and the UE, a Doppler metric based on measuring repetitions of the sounding reference signal transmitted by the UE. The operations of 1715 may be performed according to the methods described herein. In some examples, aspects of the operations of 1715 may be performed by a Doppler component as described with reference to FIGS. 12 through 15.

At 1720, the base station may transmit an indication of a configuration for an uplink demodulation reference signal that is based on the Doppler metric for the uplink channel. The operations of 1720 may be performed according to the methods described herein. In some examples, aspects of the operations of 1720 may be performed by a downlink component as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
receiving an indication of a configuration for a sounding reference signal, the configuration defining a temporal spacing between symbols reserved for repetitions of the sounding reference signal;
transmitting repetitions of the sounding reference signal in the symbols according to the configuration for the sounding reference signal; and
receiving an indication of a configuration for a demodulation reference signal based at least in part on transmitting the repetitions of the sounding reference signal, wherein the configuration for the demodulation reference signal is based at least in part on an uplink Doppler metric associated with the repetitions of the sounding reference signal.

2. The method of claim 1, wherein the configuration for the sounding reference signal is based at least in part on a carrier frequency and a subcarrier spacing used for communicating with an access network entity.

3. The method of claim 1, wherein transmitting the repetitions of the sounding reference signal comprises:
transmitting a first repetition of the sounding reference signal in a first symbol of a subframe; and
transmitting a second repetition of the sounding reference signal in a second symbol of the subframe, wherein the first symbol and the second symbol are separated by multiple symbols.

4. The method of claim 1, wherein transmitting the repetitions of the sounding reference signal comprises:
transmitting a first repetition of the sounding reference signal in a first symbol of a first subframe; and
transmitting a second repetition of the sounding reference signal in a second symbol of a second subframe, wherein the first subframe and the second subframe are consecutive.

5. The method of claim 1, wherein transmitting the repetitions of the sounding reference signal comprises:
using a same antenna port for the repetitions of the sounding reference signal.

6. The method of claim 1, wherein transmitting the repetitions of the sounding reference signal comprises:
using a same plurality of antenna ports for the repetitions of the sounding reference signal.

7. The method of claim 1, wherein transmitting the repetitions of the sounding reference signal comprises:
using sounding reference signal ports that are quasi-collocated for the repetitions of the sounding reference signal.

8. The method of claim 1, wherein transmitting the repetitions of the sounding reference signal comprises:
using a same transmission beam and a same antenna panel for the repetitions of the sounding reference signal.

9. The method of claim 1, wherein transmitting the repetitions of the sounding reference signal comprises:
transmitting the repetitions of the sounding reference signal over a same portion of a bandwidth part configured for the UE.

10. The method of claim 1, further comprising:
receiving an indication that the repetitions of the sounding reference signal are to be transmitted periodically, aperiodically, or semi-persistently.

11. A method for wireless communication at an access network entity, comprising:
selecting a configuration for a sounding reference signal based at least in part on a subcarrier spacing and a carrier frequency, the configuration defining a temporal spacing between symbols reserved for repetitions of the sounding reference signal;
transmitting an indication of the configuration for the sounding reference signal to a user equipment (UE);
determining, for an uplink channel between the access network entity and the UE, a Doppler metric based at least in part on measuring the repetitions of the sounding reference signal transmitted by the UE; and
transmitting an indication of a configuration for an uplink demodulation reference signal that is based at least in part on the Doppler metric for the uplink channel.

12. The method of claim 11, further comprising:
determining a set of candidate spacing configurations for the sounding reference signal, wherein each spacing configuration in the set of candidate spacing configurations is associated with at least one combination of a respective subcarrier spacing and a respective carrier frequency; and
selecting a spacing configuration from the set of candidate spacing configurations.

13. The method of claim 11, wherein the symbols are in a same uplink subframe.

14. The method of claim 11, wherein the symbols are in two consecutive uplink subframes.

15. The method of claim 11, further comprising:
receiving a first repetition of the sounding reference signal in a first symbol of a subframe; and
receiving a second repetition of the sounding reference signal in a second symbol of the subframe, wherein the first symbol and the second symbol are separated by multiple symbols.

16. The method of claim 11, further comprising:
receiving a first repetition of the sounding reference signal in a first symbol of a first subframe; and
receiving a second repetition of the sounding reference signal in a second symbol of a second subframe, wherein the first subframe and the second subframe are consecutive.

17. The method of claim 11, wherein a bandwidth part is configured for the UE, the method further comprising:
receiving the repetitions of the sounding reference signal over a same portion of the bandwidth part configured for the UE.

18. The method of claim 11, wherein a bandwidth part is configured for the UE, the method further comprising:
receiving the repetitions of the sounding reference signal over different portions of the bandwidth part configured for the UE.

19. The method of claim 11, further comprising:
transmitting to the UE an indication that the sounding reference signal is to be transmitted periodically, aperiodically, or semi-persistently.

20. The method of claim 11, further comprising:
determining a second subcarrier spacing and a second carrier frequency for communicating with a second UE; and
selecting a second configuration for a second sounding reference signal based at least in part on the second subcarrier spacing and the second carrier frequency, the second configuration defining a second temporal spacing between second symbols reserved for repetitions of the second sounding reference signal by the second UE.

21. The method of claim 11, further comprising:
selecting a second carrier frequency, a second subcarrier spacing, or a combination thereof, for communicating with the UE; and selecting a second configuration of the sounding reference signal based at least in part on the second carrier frequency, the second subcarrier spacing, or a combination thereof, the second configuration defining a second temporal spacing between second symbols reserved for the repetitions of the sounding reference signal.

22. The method of claim 11, further comprising:
determining a capability of the UE, wherein the configuration for the sounding reference signal is based at least in part on the capability of the UE.

23. An apparatus for wireless communication at a user equipment (UE), comprising:
a processor;
memory coupled with the processor; and
instructions stored in the memory and executable by the processor to cause the apparatus to:
receive an indication of a configuration for a sounding reference signal, the configuration defining a temporal spacing between symbols reserved for repetitions of the sounding reference signal;
transmit the repetitions of the sounding reference signal in the symbols according to the configuration for the sounding reference signal; and
receive an indication of a configuration for a demodulation reference signal based at least in part on transmitting the repetitions of the sounding reference signal, wherein the configuration for the demodulation reference signal is based at least in part on an uplink Doppler metric associated with the repetitions of the sounding reference signal.

24. The apparatus of claim 23, wherein the instructions to transmit the repetitions of the sounding reference signal are executable by the processor to cause the apparatus to:
transmit a first repetition of the sounding reference signal in a first symbol of a subframe; and
transmit a second repetition of the sounding reference signal in a second symbol of the subframe, wherein the first symbol and the second symbol are separated by multiple symbols.

25. The apparatus of claim 23, wherein the instructions to transmit the repetitions of the sounding reference signal are executable by the processor to cause the apparatus to:
transmit a first repetition of the sounding reference signal in a first symbol of a first subframe; and
transmit a second repetition of the sounding reference signal in a second symbol of a second subframe, wherein the first subframe and the second subframe are consecutive.

26. The apparatus of claim 23, wherein the instructions to transmit the repetitions of the sounding reference signal are executable by the processor to cause the apparatus to:
transmit the repetitions of the sounding reference signal over a same portion of a bandwidth part configured for the UE.

27. An apparatus for wireless communication at an access network entity, comprising:
a processor;
memory coupled with the processor; and
instructions stored in the memory and executable by the processor to cause the apparatus to:
select a configuration for a sounding reference signal based at least in part on a subcarrier spacing and a carrier frequency, the configuration defining a temporal spacing between symbols reserved for repetitions of the sounding reference signal;
transmit an indication of the configuration for the sounding reference signal to a user equipment (UE);
determine, for an uplink channel between the access network entity and the UE, a Doppler metric based at least in part on measuring the repetitions of the sounding reference signal transmitted by the UE; and
transmit an indication of a configuration for an uplink demodulation reference signal that is based at least in part on the Doppler metric for the uplink channel.

28. The apparatus of claim 27, wherein the instructions are further executable by the processor to cause the apparatus to:
receive a first repetition of the sounding reference signal in a first symbol of a subframe; and
receive a second repetition of the sounding reference signal in a second symbol of the subframe, wherein the first symbol and the second symbol are separated by multiple symbols.

29. The apparatus of claim 27, wherein the instructions are further executable by the processor to cause the apparatus to:
receive a first repetition of the sounding reference signal in a first symbol of a first subframe; and
receive a second repetition of the sounding reference signal in a second symbol of a second subframe, wherein the first subframe and the second subframe are consecutive subframes.

* * * * *